US006563644B2

(12) United States Patent
Suzuki

(10) Patent No.: US 6,563,644 B2
(45) Date of Patent: May 13, 2003

(54) FRONT TELE-CONVERTER, AND FRONT TELE-CONVERTER HAVING VIBRATION-REDUCTION FUNCTION

(75) Inventor: Kenzaburo Suzuki, Yokohama (JP)

(73) Assignee: Nikon Corporation, Tokyo (JP)

(*) Notice: Subject to any disclaimer, the term of this patent is extended or adjusted under 35 U.S.C. 154(b) by 0 days.

(21) Appl. No.: 10/116,058

(22) Filed: Apr. 5, 2002

(65) Prior Publication Data
US 2003/0021031 A1 Jan. 30, 2003

Related U.S. Application Data

(62) Division of application No. 09/735,545, filed on Dec. 14, 2000, now Pat. No. 6,424,465.

(30) Foreign Application Priority Data

Dec. 15, 1999 (JP) .............................. 11-355880
Jun. 22, 2000 (JP) ....................... 2000-187228
Dec. 6, 2000 (JP) ....................... 2000-370847

(51) Int. Cl.$^7$ .......................... G02B 27/64; G02B 15/14
(52) U.S. Cl. ....................... 359/557; 359/554; 359/689; 359/692
(58) Field of Search .............................. 359/554–557, 359/676–677, 680–684, 691–692, 745, 748; 396/52–55; 348/208

(56) References Cited

U.S. PATENT DOCUMENTS

| 4,496,223 A | 1/1985 | Baker .......................... 359/715 |
| 5,786,944 A | 7/1998 | Hagimori .................... 359/689 |
| 6,097,547 A | 8/2000 | Ogata et al. ................. 359/623 |
| 6,147,813 A | 11/2000 | Iwasaki ....................... 359/692 |

FOREIGN PATENT DOCUMENTS

| JP | 63-210810 | 9/1988 |
| JP | 3-59508 | 3/1991 |
| JP | 6-289289 | 10/1994 |
| JP | 7-119902 | 12/1995 |
| JP | 9-171205 | 6/1997 |

Primary Examiner—Thong Nguyen
(74) Attorney, Agent, or Firm—Miles & Stockbridge P.C.

(57) ABSTRACT

To provide a front tele-converter that may cause less aberrations and has a superior imaging quality though it has a high magnification, disclosed is a front tele-converter TC having an afocal magnification higher than 1.9, which is detachably mountable to a photo-taking lens L on its object side. The front tele-converter has, in order from the object side, a positive lens group GF having a positive refractive power and a negative lens group GR having a negative refractive power. The positive lens group GF has a positive cemented lens, the negative lens group GR has a positive lens with its convex surface facing the image side, a vibration-reduction lens group GV comprising a lens group consisting of part or the whole of the negative lens group GR and having a negative refractive power is movable in a direction disposed at substantially right angles with the optical axis to effect vibration reduction, and the lens groups fulfill a specific condition.

8 Claims, 14 Drawing Sheets

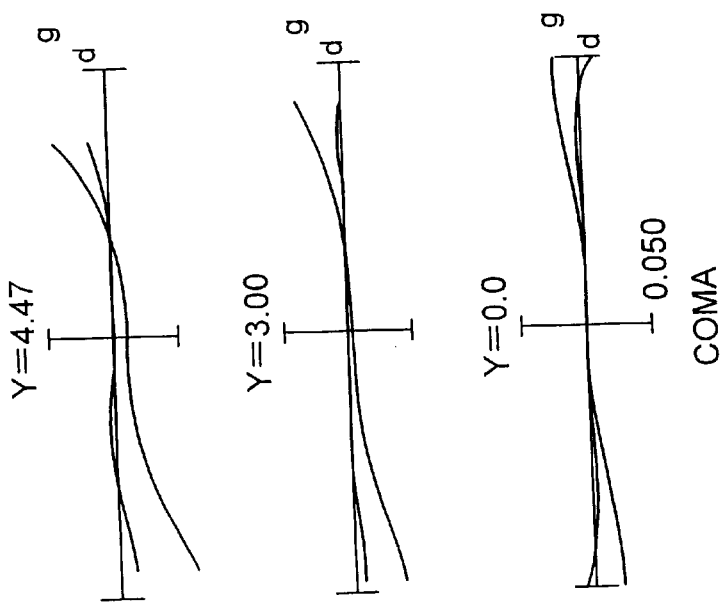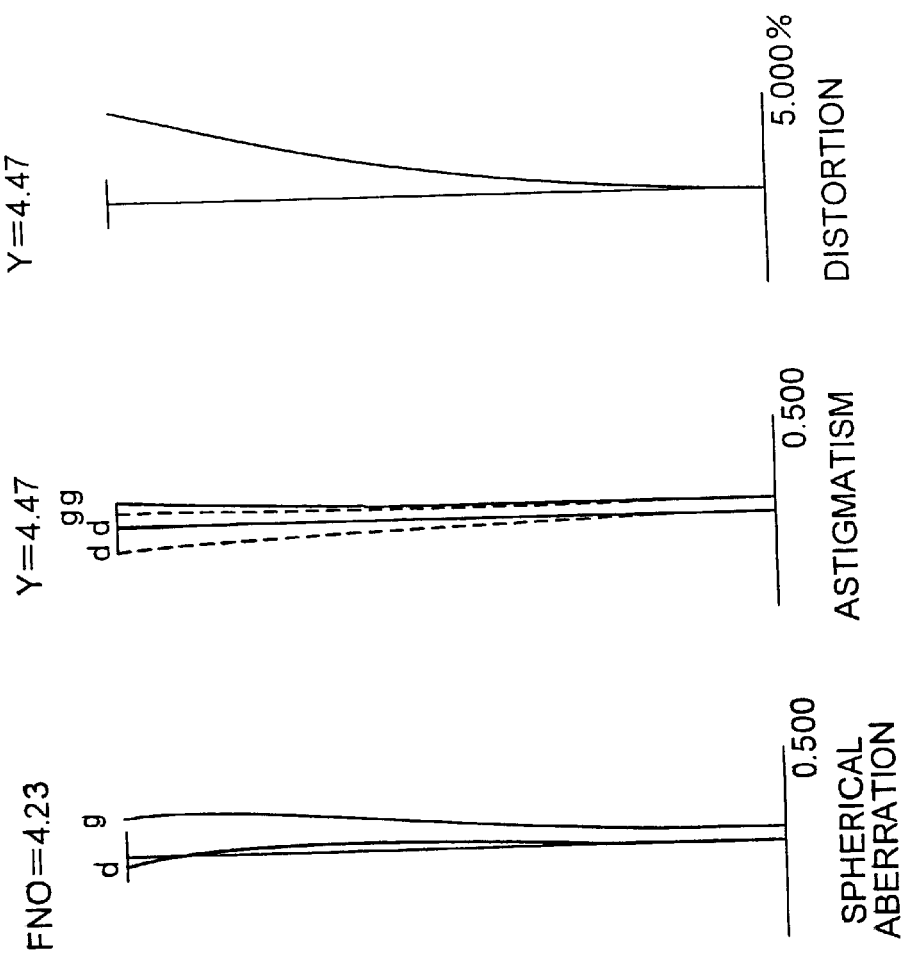

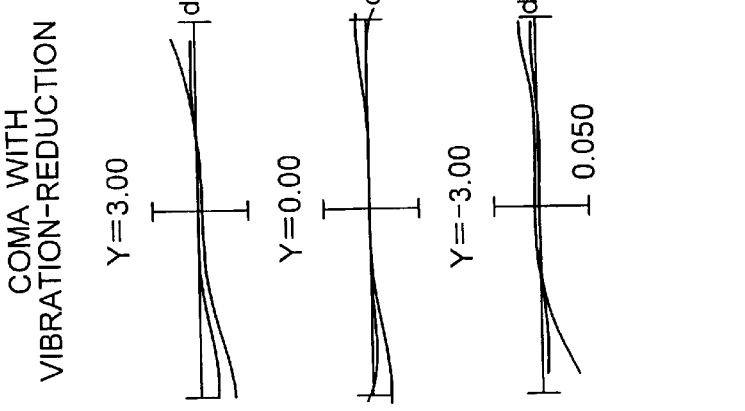
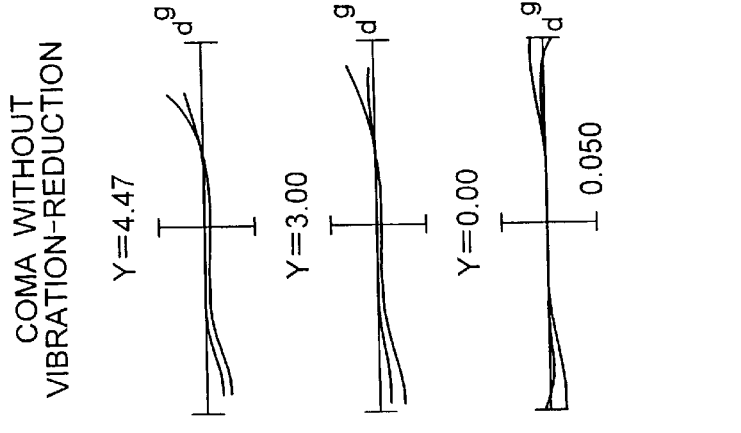
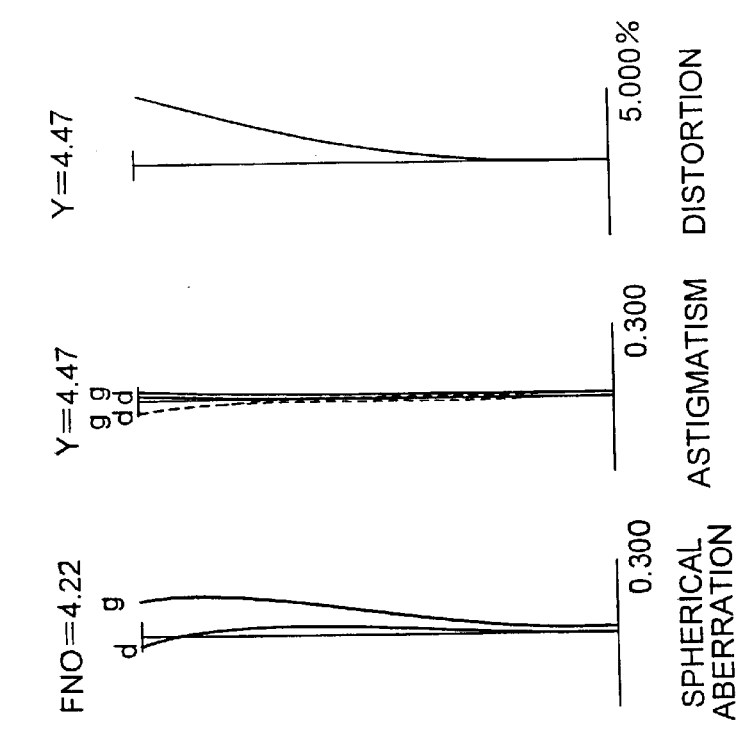

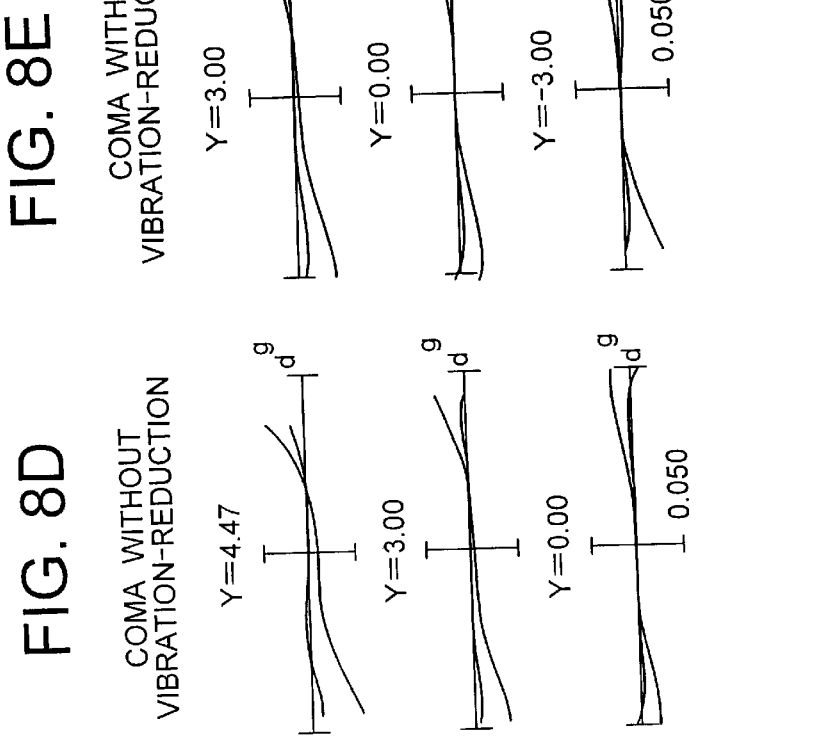

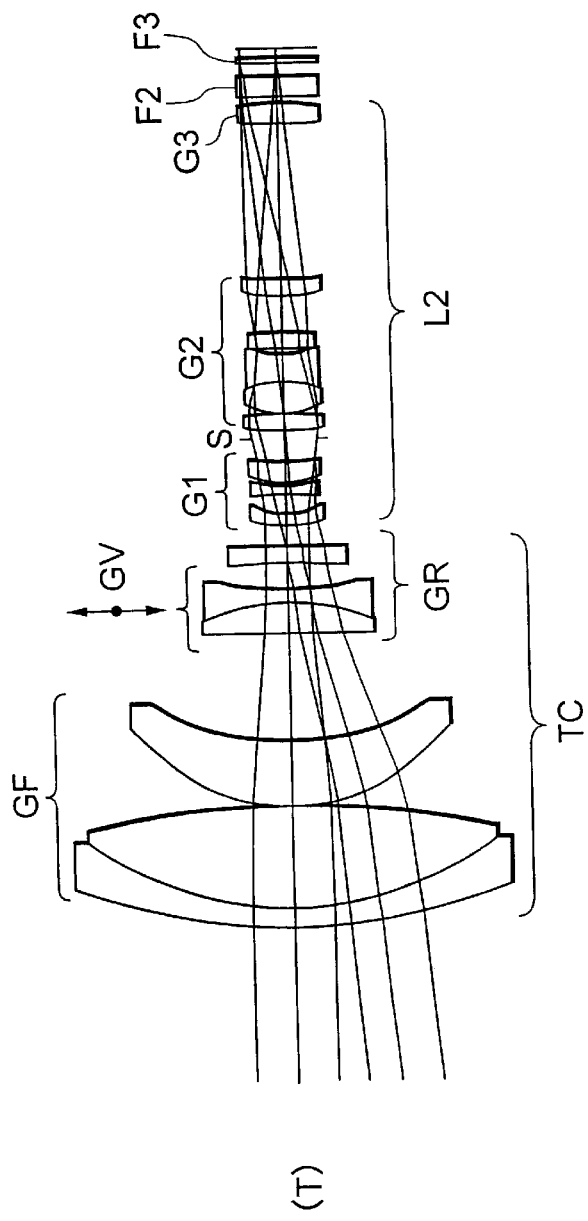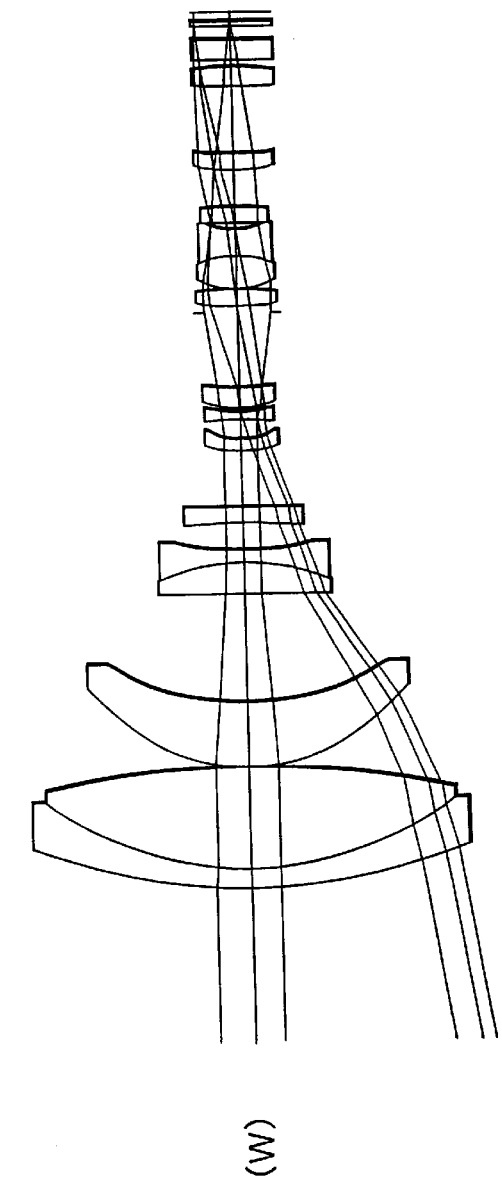
FIG. 9A (T)
FIG. 9B (W)

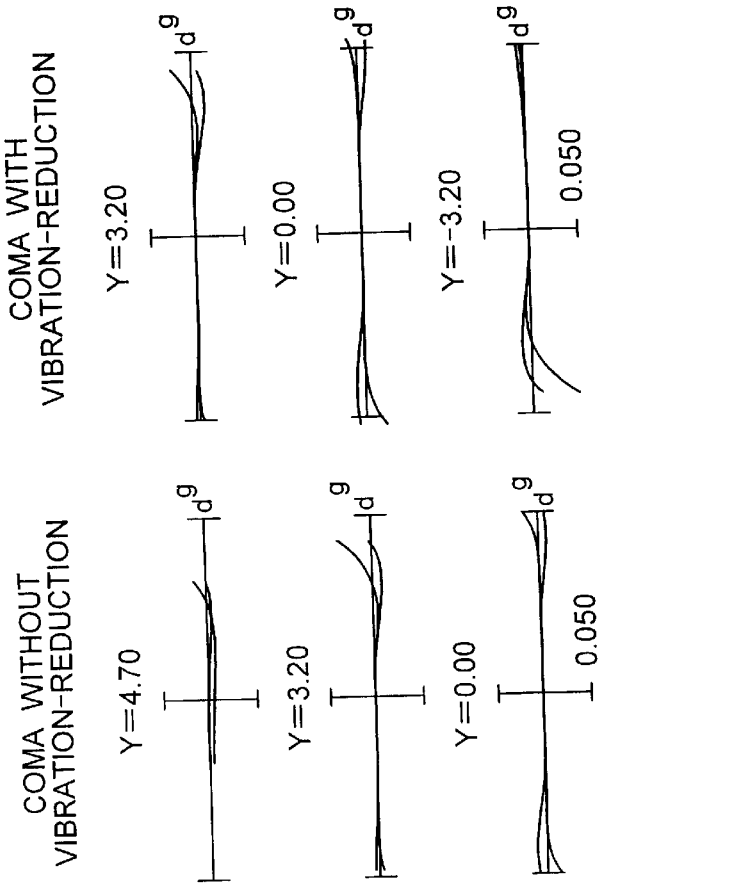

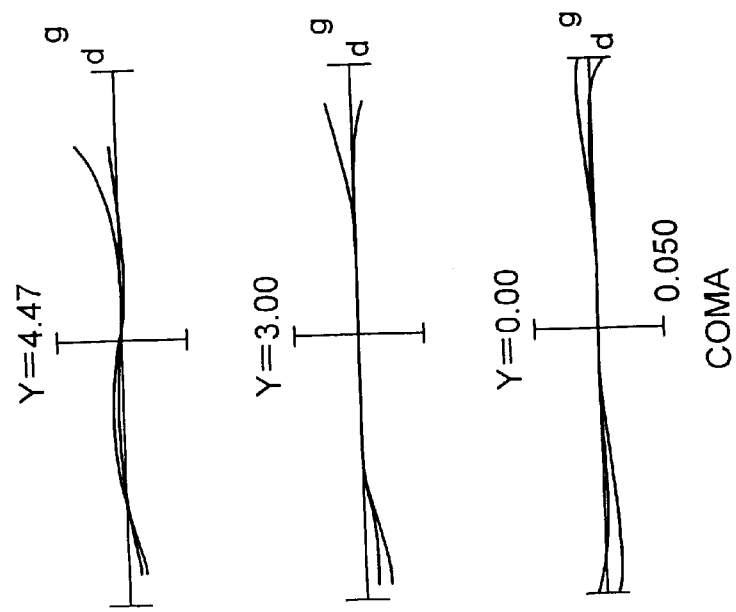
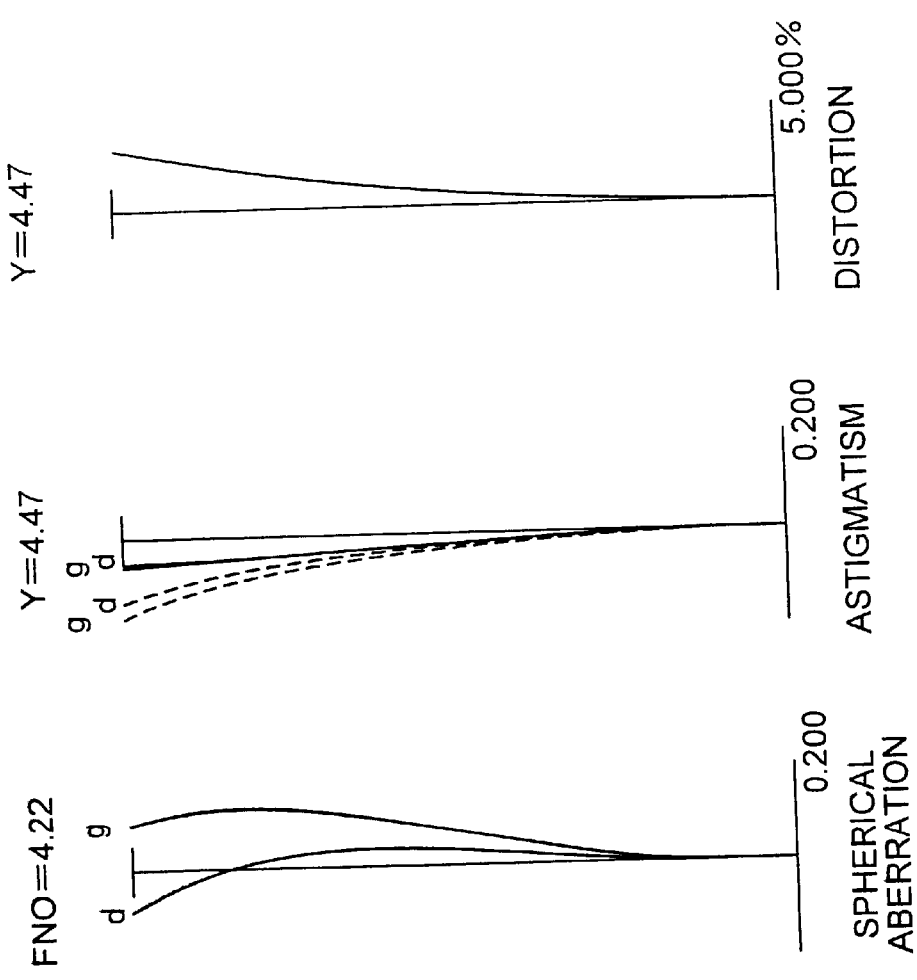

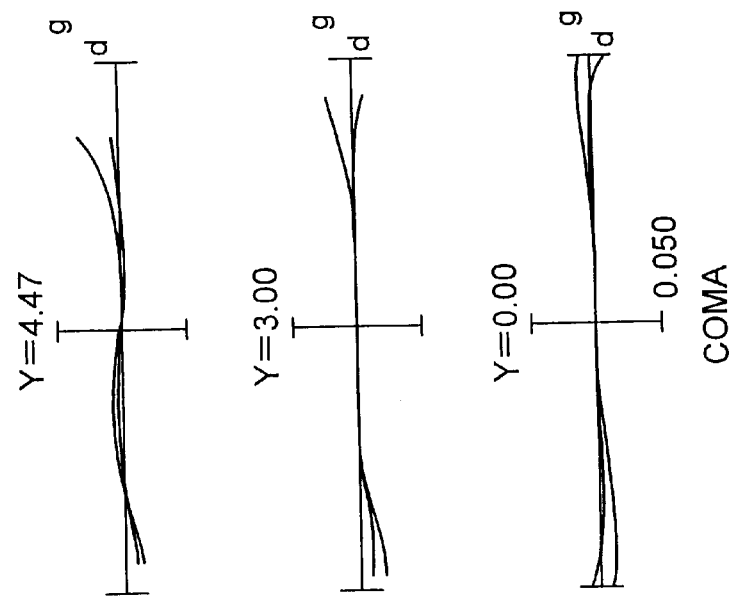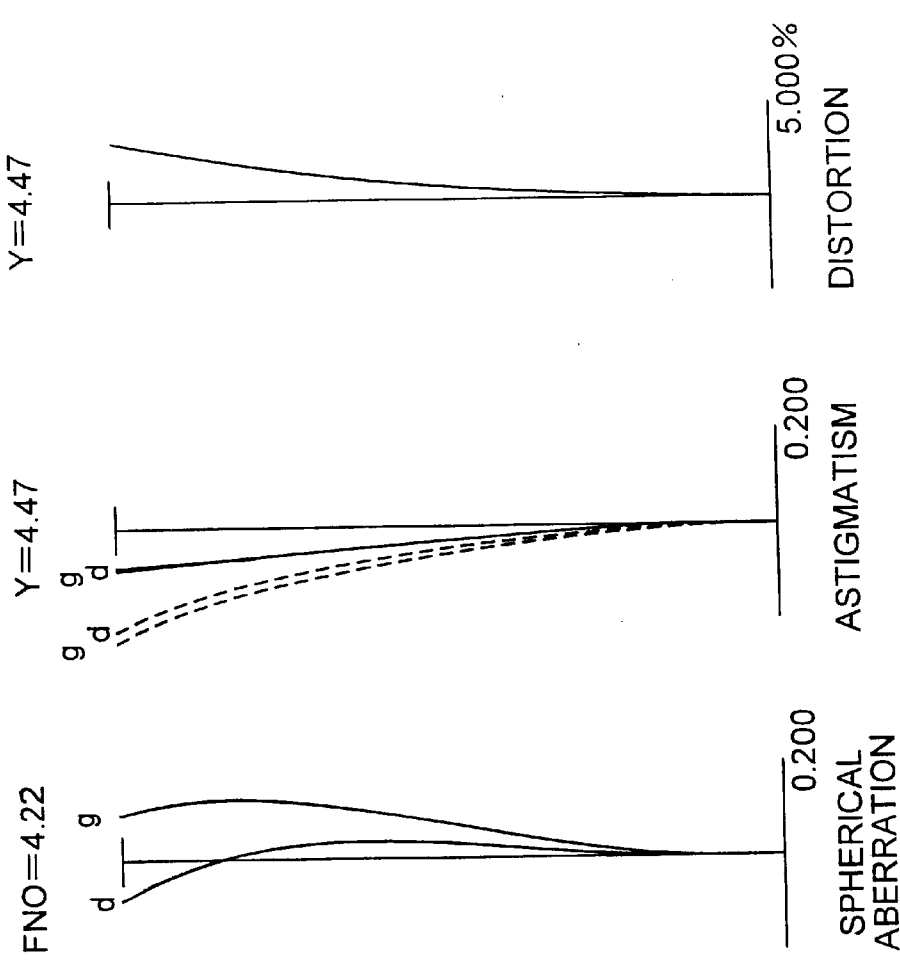

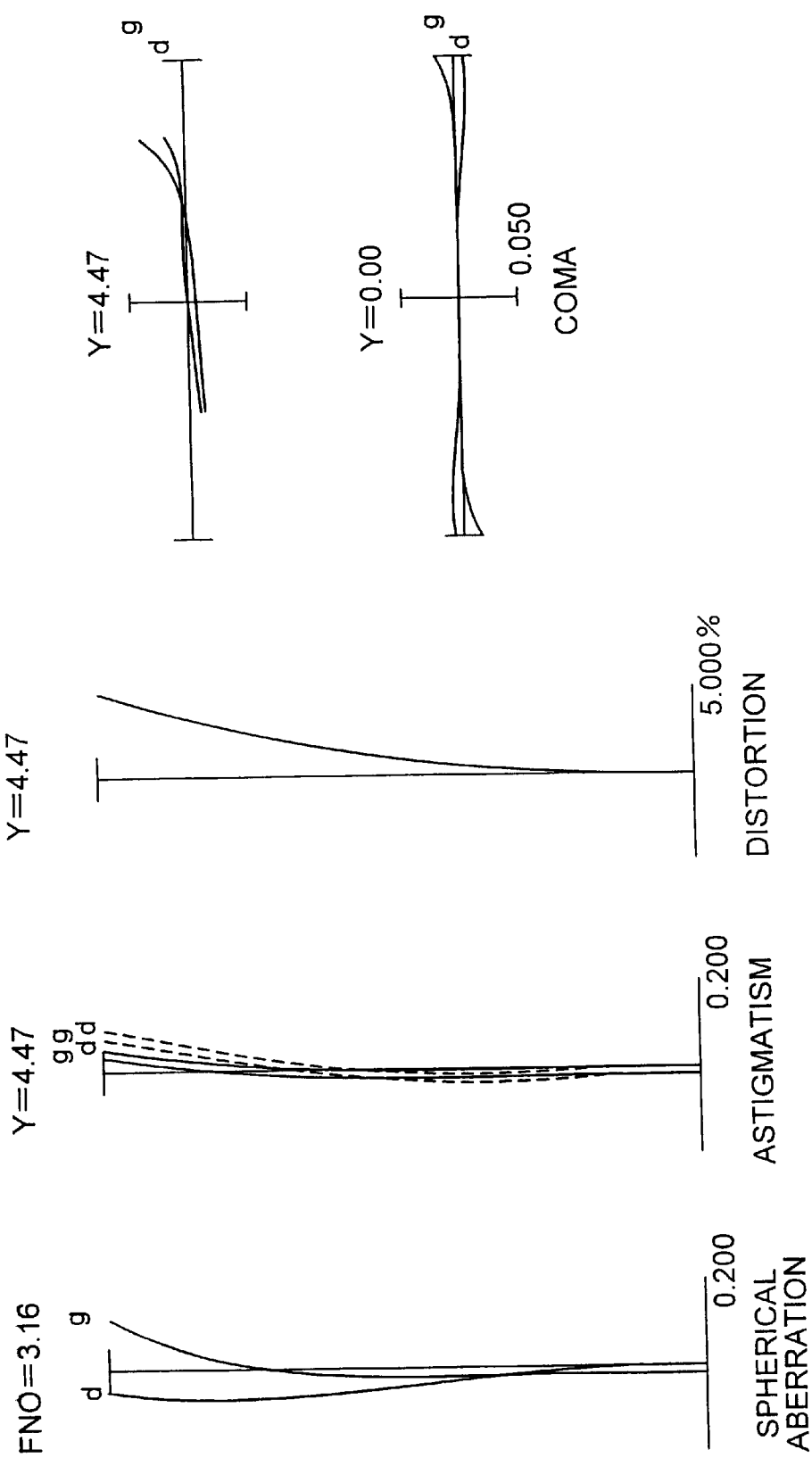

FRONT TELE-CONVERTER, AND FRONT TELE-CONVERTER HAVING VIBRATION-REDUCTION FUNCTION

CROSS-REFERENCE TO RELATED APPLICATION

This application is a division of application Ser. No. 09/735,545 filed Dec. 14, 2000 now U.S. Pat. No. 6,424,465.

The disclosures of the following priority applications are herein incorporated by reference:

Japanese Patent Application No. 11-355880, filed Dec. 15, 1999

Japanese Patent Application No. 2000-187228, filed Jun. 22, 2000

Japanese Patent Application No. 2000-370847, filed Dec. 6, 2000

BACKGROUND OF THE INVENTION

1. Field of the Invention

This invention relates to a front tele-converter, and more particularly to a front tele-converter mounted on the object side of a photo-taking lens in order to enlarge its focal length, and also relates to its vibration-reduction technique.

2. Related Background Art

Front tele-converters conventionally used for video cameras are disclosed in, e.g., Japanese Patent Application Laid-open No.63-210810 and No.3-59508.

Vibration-reduction techniques for front tele-converters are also disclosed in Japanese Patent Publication No.7-119902 and Japanese Patent Application Laid-open No.9-171205.

The front tele-converter disclosed in Japanese Patent Application Laid-open No.63-210810, however, has had a disadvantage that it can attain a good imaging quality with difficulty because of its relatively small number of lenses and a simple construction.

The front tele-converter disclosed in Japanese Patent Application Laid-open No.3-59508 also has had a disadvantage that it is of low value in practical use because of its afocal magnification which is as low as about 1.46.

The front tele-converters disclosed in Japanese Patent Publication No.7-119902 and Japanese Patent Application Laid-open No.9-171205 still also have a relatively small number of lenses and a simple construction, also having a low afocal magnification, and can not be said to be high in the basic picture quality itself. In particular, the front tele-converter disclosed in Japanese Patent Publication No.7-119902 has an afocal magnification of as low as about 1.2 at best, and has had a disadvantage that it is of low value in practical use. Also, the front tele-converter disclosed in Japanese Patent Application Laid-open No.9-171205 has a simple construction that its vibration-reduction lens group consists of one negative lens, and hence has had a disadvantage that it can attain a good imaging quality with difficulty.

SUMMARY OF THE INVENTION

As a first basic embodiment of the present invention (hereinafter "first invention"), an object of the present invention is to provide a front tele-converter that may cause less aberrations and has a superior imaging quality though it has a high magnification.

To achieve the above object, the first invention provides a front tele-converter having an afocal magnification higher than 1.9, which is detachably mountable to a photo-taking lens on its object side, wherein;

the front tele-converter has, in order from the object side, a positive lens group GF having a positive refractive power and a negative lens group GR having a negative refractive power;

the positive lens group GF has a positive cemented lens;

the negative lens group GR has a positive lens with its convex surface facing the image side; and where a focal length of the negative lens group GR is represented by fF, and an effective aperture of a lens surface of the positive lens group GF on its side closest to the object side by $\Phi F$, the lens groups fulfill the condition of:

$$0.5 < \Phi F/|fR| < 10.0$$

According to a preferred embodiment of the first invention, the positive lens group GF has a positive cemented lens consisting of combination of a negative meniscus lens disposed closest to the object side with its convex surface facing the object side and a positive lens;

the negative lens group GR has a positive lens disposed closest to the object side and a biconcave lens disposed on the image side of the positive lens; and where a focal length of the positive lens group GF is represented by fF, and an effective aperture of a lens surface of the negative lens group GR on its side closest to the object side by $\Phi R$, the lens groups fulfill the condition of:

$$0.03 < \Phi R/fF < 1.0$$

According to another preferred embodiment of the first invention, the positive lens group GF is constituted of, in order from the object side, a positive cemented lens consisting of combination of a negative meniscus lens with its convex surface facing the object side and a positive lens, and a positive meniscus lens; and at least one lens of the positive lens and the positive meniscus lens is formed of an optical glass having an Abbe number υd of 65 or more; and where a focal length of the positive lens group GF is represented by fF, an afocal magnification of the front tele-converter by M, and an axial gap between the positive lens group GF and the negative lens group GR by DFR, the lens groups fulfill the condition of:

$$3.0 < fF \cdot M/DFR < 15.0$$

As a second basic embodiment of the present invention (hereinafter "second invention"), another object of the present invention is to provide a front tele-converter that can well correct various aberrations also at the time of vibration reduction and has a superior imaging quality and a superior vibration-reduction quality, though it has a high magnification.

To achieve the above object, the second invention provides a front tele-converter having vibration-reduction function, having an afocal magnification higher than 1.9, which is detachably mountable to a photo-taking lens on its object side, wherein;

the front tele-converter has, in order from the object side, a positive lens group GF having a positive refractive power and a negative lens group GR having a negative refractive power;

the positive lens group GF has a positive cemented lens;

the negative lens group GR has a cemented lens comprising a positive lens with its convex surface facing the image side;

a vibration-reduction lens group GV comprising a lens group consisting of part or the whole of the negative lens group GR and having a negative refractive power is movable in the direction falling at substantially right angles with the optical axis to effect vibration reduction; and where the maximum amount of movement of the vibration-reduction lens group GV at the time of vibration reduction, in the direction falling at substantially right angles with the optical axis is represented by ΔS, a focal length of the vibration-reduction lens group GV by fV, and a focal length of the positive lens group GF by fF, the lens groups fulfill the conditions of:

$$\Delta S/|fV|<0.2; \text{ and}$$

$$0.1<|fV|/fF<5.0$$

According to a preferred embodiment of the second invention, where the maximum amount of movement of the vibration-reduction lens group GV in the direction falling at substantially right angles with the optical axis is represented by ΔS, an effective aperture of a lens surface of the positive lens group GF on its side closest to the object side by ΦF, and an effective aperture of a lens surface of the negative lens group GR on its side closest to the object side by ΦR, the lens groups fulfill the condition of:

$$\Delta S/\Phi F<0.2; \text{ and}$$

$$2.0<\Phi F/\Phi R<10.0$$

According to another preferred embodiment of the second invention, the positive lens group GF has a positive cemented lens consisting of combination of a negative meniscus lens disposed closest to the object side and a positive lens;

the negative lens group GR has a positive lens disposed closest to the object side and a biconcave lens disposed on the image side of the positive lens; and where a focal length of the positive lens group GF is represented by fF, and an effective aperture of a lens surface of the negative lens group GR on its side closest to the object side by ΦR, the lens groups fulfill the condition of:

$$0.03<\Phi R/fF<1.0$$

According to still another preferred embodiment of the second invention, the vibration-reduction lens group GV comprises, in order from the object side, a cemented lens consisting of combination of a positive lens with its convex surface facing the image side and a biconcave lens; and where an effective aperture of a lens surface of the vibration-reduction lens group GV on its side closest to the object side is represented by ΦV, and an air gap between the positive lens group GF and the negative lens group GR along the optical axis by DFR, the lens groups fulfill the condition of:

$$0.000001<(\Delta S)^2/DFR\cdot\Phi V<0.01$$

BRIEF DESCRIPTION OF THE DRAWINGS

FIGS. 4A to 4D are diagrams showing various aberrations of the synthesized optical system in Second Embodiment.

FIGS. 6A to 6E are diagrams showing various aberrations of the synthesized optical system in Third Embodiment.

FIGS. 8A to 8E are diagrams showing various aberrations of the synthesized optical system in Fourth Embodiment.

FIGS. 9A and 9B illustrate the lens construction of a synthesized optical system consisting of a front tele-converter TC and a photo-taking lens L2, according to Fifth Embodiment.

FIGS. 11A to 11E are diagrams showing various aberrations of the synthesized optical system in Fifth Embodiment when the photo-taking lens L2 is in a wide-angle end state.

FIGS. 12A to 12D are diagrams showing various aberrations of a single optical system of a photo-taking lens L1 in Third Embodiment.

FIGS. 13A to 13D are diagrams showing various aberrations of single optical systems in Fourth Embodiment and Fifth Embodiment when the photo-taking lenses L2 are in a telephoto end state.

FIGS. 14A to 14D are diagrams showing various aberrations of single optical systems in Fourth Embodiment and Fifth Embodiment when the photo-taking lenses L2 are in a wide-angle end state.

DESCRIPTION OF THE PREFERRED EMBODIMENTS

Figure 1:
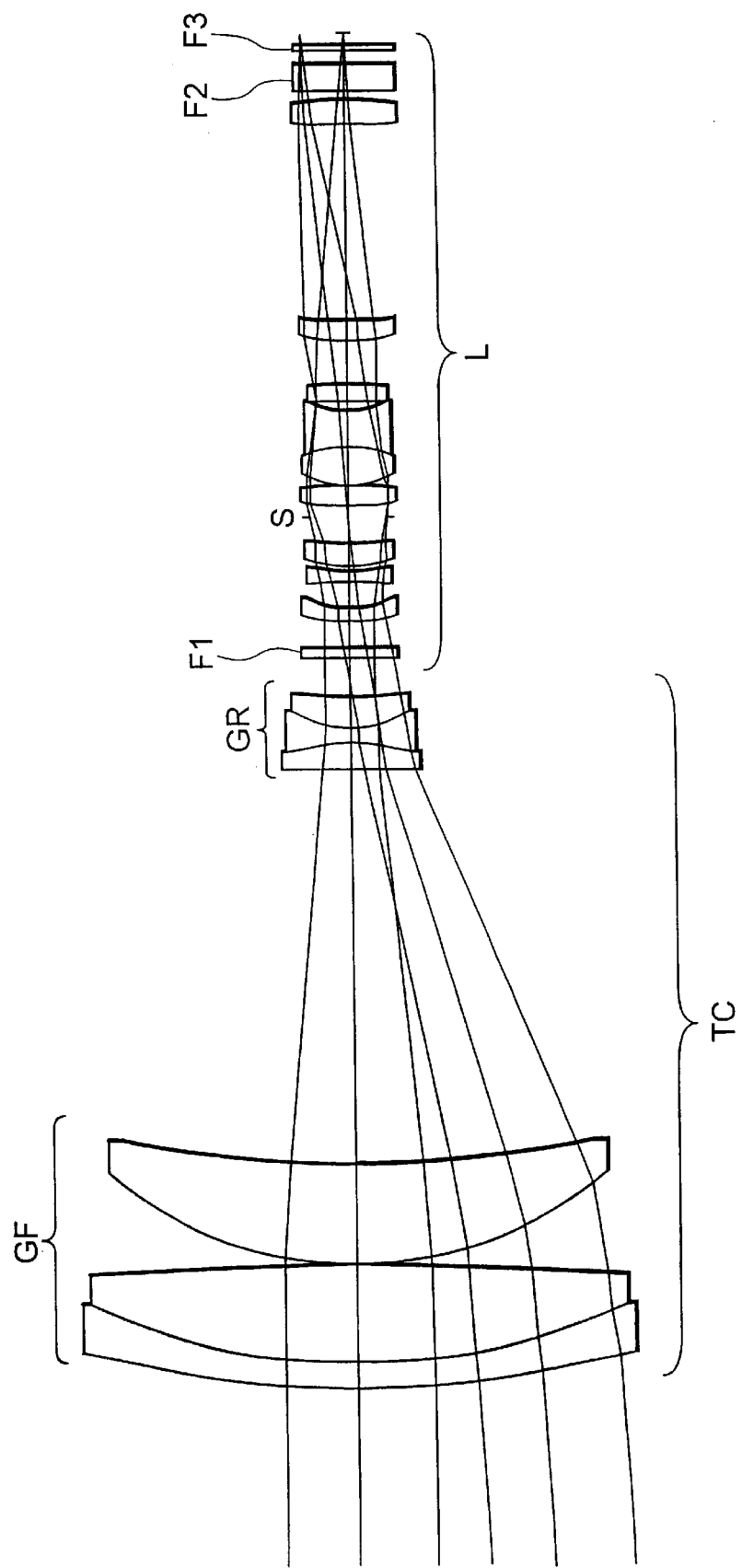
FIG. 1 illustrates the lens construction of a synthesized optical system consisting of a front tele-converter TC and a photo-taking lens L, according to First Embodiment.
Figure 2:
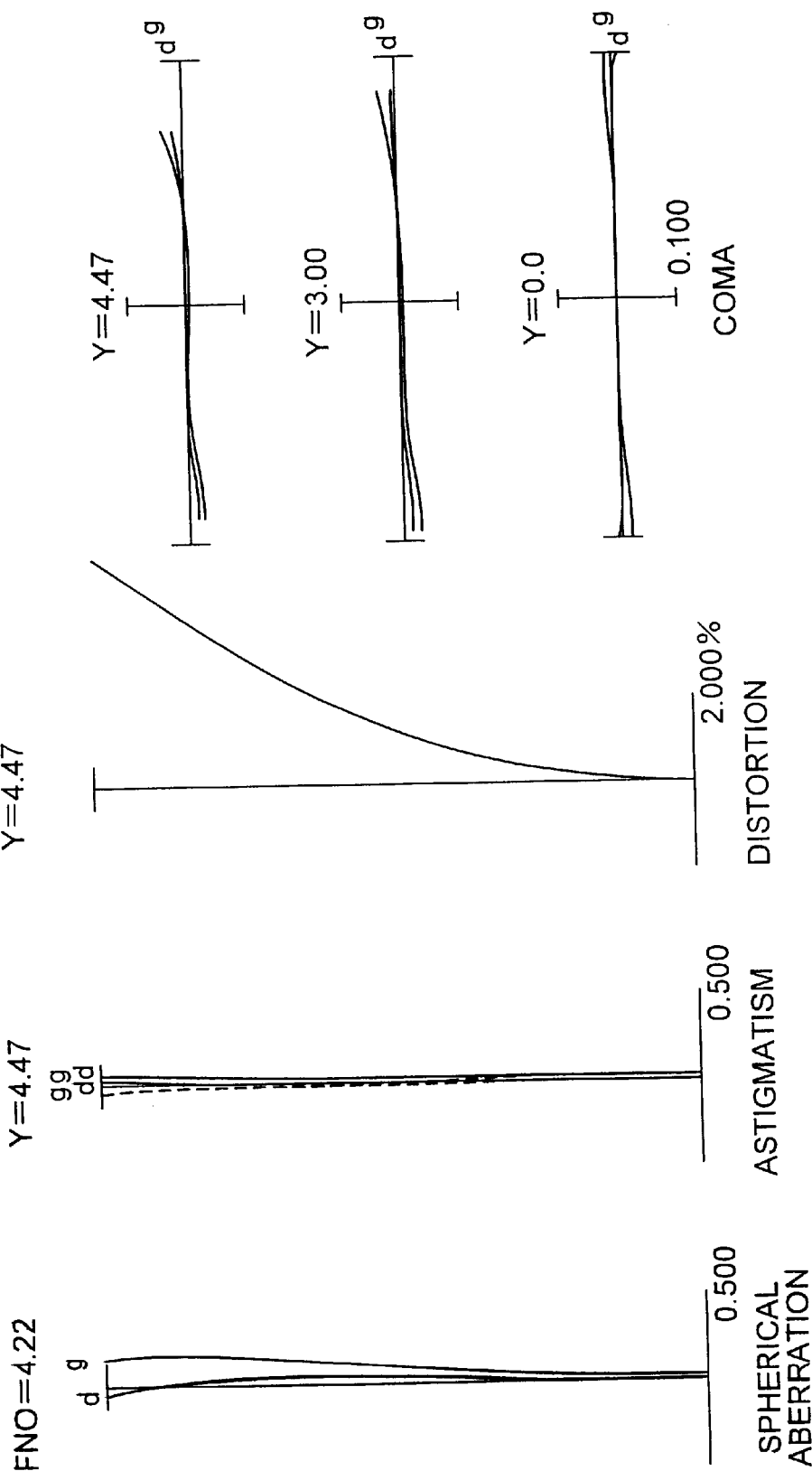
FIGS. 2A to 2D are diagrams showing various aberrations of the synthesized optical system in First Embodiment.

The front tele-converter is first explained below from a standpoint of optics.

In the present invention, the front tele-converter refers to an optical system which is mounted to an objective lens on its object side and through which parallel light beam having entered from the object side exits to the image side in parallel. In this case, an afocal magnification M of the front tele-converter relates to the magnitude of an angle of inclination of an axial paraxial ray, and indicates the ratio of incident side to emergent (exit) side ($|\theta out/\theta in|$, where θout is an angle of inclination of an axial paraxial ray on the emergent side, and θin an angle of inclination of an axial paraxial ray on the incident side.

The present invention is concerned with a front tele-converter having an afocal magnification higher than 1.9, i.e., a front tele-converter having the function of what is called telephotographying.

Stated specifically, the front tele-converter of the present invention constitutes a Galilean type optical system. More specifically, it has, in order from the object side, a positive lens group GF having a positive refractive power and a negative lens group GR having a negative refractive power, where the image-side focal point of the positive lens group GF and the object-side focal point of the negative lens group GR are kept in agreement with each other. As the result, light ray made incident from the object side in parallel are passed through the front tele-converter of the present invention and thereafter are parallel emitted to the image side. Accordingly, the tele-converter is also called an afocal converter.

Hence, where a focal length of the positive lens group GF is represented by fF and a focal length of the negative lens group GR by fF, the afocal magnification M of the front tele-converter of the present invention is represented by th following formula (a):

$$M = fF/|fR| \qquad (a);$$

provided that, even when the image-side focal point of the positive lens group GF and the object-side focal point of the negative lens group GR are not kept in agreement, the afocal magnification M relates to the magnitude of an angle of inclination of an axial paraxial ray, and is defined to be the ratio of incident side to emergent side ($|\theta out/\theta in|$), i.e., $M = |\theta out/\theta in|$.

This value of M is determined by paraxial-tracing calculation of only the part of lens data of the front tele-converter. More specifically, the afocal magnification of a front tele-converter depends not on master lenses but on parameters that constitute the front tele-converter.

In practical use, however, the image-side focal point of the positive lens group GF and the object-side focal point of the negative lens group GR need not to be kept in strict agreement.

The lens may be focused (brought into focus) by moving any one of the positive lens group GF and the negative lens group GR along the optical axis, or the focal points of the both may be kept well close to each other within the range in which the lens can be focused using the rearward photo-taking lens (objective lens).

Also when the focal points of the both are not in strict agreement in this way, the afocal magnification relates to the magnitude of an angle of inclination of an axial paraxial ray and be considered to be the ratio of incident side to emergent side. In such a case the afocal magnification deviates from the formula (a), but may deviate in only a small amount.

When both the focal points are brought in a strict agreement, the synthesized focal length of any imaging lens system (assumed to have a focal length f) is given by M×f, but, when not in agreement, it deviates a little from M×F. The synthesized focal length of the whole optical system is determined by paraxial-ray-tracing calculation.

The front tele-converter may also include Keplerian type afocal converters in which a positive lens group and an additional positive lens group are combined. In order to make the front tele-converter have a small total length, it may preferably be an afocal converter of the Galilean type described above. Also, such an Galilean type afocal converter is well mountable to photo-taking lenses of cameras or the like because the posture of images does not change also when it is in the state of being mounted.

In an additional optical system like the front tele-converter of the present invention, unless aberrations have been well removed in the system itself, aberrations in a synthesized optical system where the converter is kept mounted to a photo-taking lens (i.e., front tele-converter+ photo-taking lens) may seriously occur to make the synthesized imaging quality poor.

The present invention is related, in such Galilean type afocal converters, to a front tele-converter that may cause less aberrations and has a superior imaging quality though it has a high magnification.

The present invention will be described below in greater detail with reference to specific conditions.

In the present invention, the positive lens group GF has a positive cemented lens, and the negative lens group GR has a positive lens with its convex surface facing the image side; and the lens groups fulfill the following condition (1):

$$0.5 < \Phi F/|fR| < 10.0 \qquad (1)$$

wherein fF represents a focal length of the negative lens group GR; and $\Phi F$, an effective aperture (diameter) of a lens surface of the positive lens group GF on its side closest to the object side.

The condition (1) shows an appropriate range for the proportion of an effective aperture $\Phi F$ of a lens surface of the positive lens group GF on its side closest to the object side to a focal length fF of the negative lens group GR.

This condition (1) specifies the diameter of a light ray that passes through the positive lens group GF which is a front group of the front tele-converter and the focal length of the negative lens group GR which is a rear group, and is a condition important for selectively passing light rays necessary to obtain a sufficiently good image quality and also for controlling the refractive power of the negative lens group GR within a proper range.

If its value is greater than the upper-limit value of the condition (1), the lens surface of the positive lens group GF on its side closest to the object side has a too large effective aperture $\Phi F$, i.e., light rays pass through the positive lens group GF at a too high position, to greatly cause aberrations disadvantageously.

In addition, stray light tends to enter the optical system to bring about a disadvantage that ghost or flare tends to occur. Moreover, the front cell diameter (the diameter of a lens disposed closest to the object side) comes to be so large as to not only make the optical system larger but also bring about a disadvantage that the system has a greater weight.

If on the other hand its value is smaller than the lower-limit value of the condition (1), the lens surface of the positive lens group GF on its side closest to the object side has a too small effective aperture $\Phi F$ to attain a sufficient quantity of rim (peripheral) light, disadvantageously.

In order to bring out the effect of the present invention more sufficiently, the upper-limit value of the condition (1) may preferably be 2.5, and the lower-limit value, 0.08.

In the present invention, the positive lens group GF may also have a positive cemented lens consisting of combination of a negative meniscus lens disposed closest to the object side with its convex surface facing the object side and a positive lens, the negative lens group GR may have a positive lens disposed closest to the object side and a biconcave lens disposed on the image side of the positive lens, and the lens groups may preferably fulfill the condition (2):

$$0.03 < \Phi R/fF < 1.0 \qquad (2)$$

wherein $\Phi R$ represents an effective aperture (diameter) of a lens surface of the negative lens group GR on its side closest to the object side; and fF, a focal length of the positive lens group GF.

The condition (2) shows an appropriate range for the proportion of an effective aperture $\Phi R$ of a lens surface of the negative lens group GR on its side closest to the object side to a focal length fF of the positive lens group GF.

Its value greater than the upper-limit value of the condition (2) is undesirable because the positive lens group GF has a too small focal length fF, so that the spherical aberration may seriously occur in the tele-converter to damage picture quality. Such a value is also not undesirable because, when the positive lens group GF is assembled to a lens barrel, any decentration may so greatly affect the optical quality as to make production difficult.

Its value which on the other hand is smaller than the lower-limit value of the condition (2) is undesirable because the positive lens group GF may have so large a focal length fF that the tele-converter has a large total length. Such a value is also undesirable because an excessive longitudinal chromatic aberration may result to damage picture quality. Such a value is still also undesirable because a large front cell diameter may result in an attempt to provide rim light in an amount beyond a certain level.

In order to bring out the effect of the present invention more sufficiently, the upper-limit value of the condition (2) may preferably be 0.3, and the lower-limit value, 0.08. Also, in the present invention, it has been found that the above condition (2) is effective when the afocal magnification is higher than 1.9.

It has also been found that, in order to ensure a good imaging quality, it is important for the negative lens group GR, disposed on the image side, to have a positive lens. In particular, it is important for the negative lens group GR to have a positive lens in order to well correct the Petzval sum when a good flatness of the imaging plane is ensured.

In the present invention, in order to achieve a much better imaging quality, the positive cemented lens in the positive lens group GF may preferably be constituted of combination of, in order from the object side, a negative meniscus lens with its convex surface facing the object side and a positive lens.

When the front tele-converter of the present invention is mounted to the photo-taking lens on its object side, a chromatic aberration caused in the tele-converter is added to a chromatic aberration of an original master lens (the photo-taking lens). Hence, the above constitution of the positive cemented lens is important especially for sufficient axial achromatism in the synthesized optical system (i.e., tele-converter+photo-taking lens).

Also, the positive lens constituting the positive cemented lens can well correct a spherical aberration and a coma of light rays on the side lower than the principal (chief) ray (a lower coma), and hence, the positive cemented lens constituted as described above is an important requirement for achieving a good imaging quality.

In the present invention, the positive lens group GF may preferably constituted of, in order from the object side, i) a positive cemented lens consisting of combination of a negative meniscus lens with its convex surface facing the object side and a positive lens and ii) a positive meniscus lens, and the lens groups fulfill the following condition (3):

$$3.0 < fF \cdot M/DFR < 15.0 \tag{3}$$

wherein fF represents a focal length of the positive lens group GF; M, an afocal magnification of the front tele-converter; and DFR, an axial gap (air gap along the optical axis) between the positive lens group GF and the negative lens group GR.

Its value greater than the upper-limit value of the condition (3) is undesirable because the positive lens group GF has a too large focal length fF corresponding to the afocal magnification M, so that not only the tele-converter has a large total length, but also the spherical aberration and longitudinal chromatic aberration may greatly occur. Such a value is also not undesirable because a large front cell diameter tends to result to not only make the optical system have a larger size but also make it have a greater weight.

Its value which on the other hand is smaller than the lower-limit value of the condition (3) is undesirable because the positive lens group GF may have so small a focal length as to not only make imaging plane curvature large but also cause a great coma of light rays on the side lower than the principal ray, tending to damage picture quality. Such a value is also not undesirable because a large axial gap DFR between the positive lens group GF and the negative lens group GR may result, so that the tele-converter has a large total length.

In order to bring out the effect of the present invention more sufficiently, the upper-limit value of the condition (3) may preferably be 9.0, and the lower-limit value, 5.0.

In addition, in order to effect sufficient achromatism, the positive lens group GF may preferably have at least one positive lens formed of a low-dispersive glass. Stated more specifically, the positive lens group GF may preferably have at least one positive lens formed of an optical glass having what is called an Abbe number υd of 65 or more. Such constitution enables sufficient correction of not only longitudinal chromatic aberration but also chromatic aberration of magnification to achieve a good imaging quality. In order to bring out the effect of the present invention more sufficiently, the positive lens group GF may preferably have at least one positive lens formed of an optical glass having an Abbe number υd of 80 or more.

The positive lens group GF may further preferably have at least one positive lens formed of an optical glass having anomalous dispersion. This is very important for making the tele-converter have a high magnification.

The anomalous dispersion is described below briefly.

The ratio of two types of partial dispersion an optical glass has (a difference in refractive index to light rays with two different wavelengths) is called relative partial dispersion, and takes note of an amount P(gFdC) defined by the following equation (b):

$$P(gFdC)=(ng-nd)/(nF-nC) \tag{b}$$

wherein g, F, d and C each a symbol of a spectral line; nd represents a refractive index to the d-line ($\lambda$=587.6 nm); ng represents a refractive index to the g-line ($\lambda$=435.8 nm); nF represents a refractive index to the F-line ($\lambda$=486.1 nm); and nC represents a refractive index to the C-line ($\lambda$=656.3 nm).

When this relative partial dispersion P(gFdC) and the Abbe number υd are plotted as the ordinate and abscissa of a graph, those standing deviated from the coordinates of normal glass are called the glass having anomalous dispersion. To describe in a more specific manner, the normal glass is typified by, e.g., crown glass and flint glass which are available from Schott Glas. Those standing deviated from a line formed by connecting the coordinates of these two glasses are called the glass having anomalous dispersion.

In the present invention, it has been found that in order to effect sufficient achromatism it is very effective to use for the positive lens in the positive lens group GF an optical glass having an Abbe number υd of 80 or more and a relative partial dispersion P(gFdC) of 0.8 or more. It has also been found that forming the positive lens in the positive lens group GF by the use of the low-dispersive glass is more preferable because the effect of achromatism as the cemented lens can sufficiently be brought out. Also, a good achromatic effect can be attained also when the the low-dispersive glass is used for any of the positive lenses in the positive lens group GF.

In the present invention, in addition to the above constitution, the negative lens group GR may also be constituted of, in order from the object side, a cemented lens consisting of combination of a positive meniscus lens, a biconcave lens and a positive meniscus lens, and the refractive index to the d-line of this biconcave lens may preferably fulfill the following condition (4):

$$1.7 < nd \tag{4}$$

If its value is lower than the lower-limit value of the condition (4), the Petzval sum of the whole optical system tends to be displaced (shifted) to the negative side. As the result, the imaging plane may greatly be curved to the positive side to make poor the imaging quality around the image undesirably.

In order to bring out the effect of the present invention more sufficiently, the lower-limit value of the condition (4) may preferably be 1.8.

In the present invention, it has been found that the above conditions (1) to (4) are more effective when the afocal magnification is higher than 2.5, i.e., when the tele-converter has a high magnification.

In the present invention, in order to achieve a much better imaging quality, in addition to the above constitution, the negative lens group GR may preferably fulfill the following conditions (4) and (5):

$$1.6 < N \tag{5}$$

$$-2.0 < (RB+RA)/(RB-RA) < 0 \tag{6}$$

wherein N represents a refractive index to the d-line of a positive lens in the negative lens group GR (when it has a plurality of positive lenses, their average value is found); RA represents a radius of curvature of an object-side surface of the biconcave lens in the negative lens group GR; and RB represents a radius of curvature of an image-side surface of the biconcave lens in the negative lens group GR.

The condition (5) specifies an appropriate range for the refractive index to the d-line of the positive lens in the negative lens group GR.

If its value is lower than the lower-limit value of the condition (5), the positive lens has so small a refractive index N that Petzval sum tends to be on the negative side. As the result, among various aberrations, particularly the imaging plane tends to be curved greatly to damage picture quality undesirably. This condition (5) is effective especially when the afocal magnification is higher than 2.5.

The condition (6) specifies an appropriate range for a shape factor (SF) of the biconcave lens in the negative lens group GR. The shape factor is a parameter that shows the shape of a lens. The lens shape becomes biconcave or meniscus-shaped according to this value.

Its value greater than the upper-limit value of the condition (6) is undesirable because the biconcave lens has so large a shape factor as to cause a great coma of light rays on the side lower than the principal ray. Such a value is also undesirable because the lens shape may make it difficult to manufacture lenses. Such a value is still also undesirable because a disadvantage is brought about such that ghost or flare due to surface reflection may greatly occur.

Its value which on the other hand is lower than the lower-limit value of the condition (6) is undesirable because the biconcave lens has so small a shape factor as to cause a great spherical aberration on the positive side. Such a value is also undesirable because the surface on the object side is so close to a flat surface as to bring about disadvantages that ghost or flare due to surface reflection tends to occur and picture quality is damaged.

In order to bring out the effect of the present invention more sufficiently, the upper-limit value may preferably be −0.1, and the lower-limit value, −0.6.

In the present invention, it has also be found that, like the conditions (1) to (4), the conditions (5) and (6) are also more effective when the afocal magnification is higher than 2.5.

When the tele-converter is actually set up, it is preferable for much better imaging quality that the positive lens group GF is constituted of, in order from the object side, i) a positive cemented lens consisting of combination of a negative meniscus lens with its convex surface facing the object side and a positive lens and ii) a positive meniscus lens with its convex surface facing the object side, and at least one lens of the positive lens and the positive meniscus lens is formed of a low-dispersive glass having an Abbe number υd of 80 or more.

In such a case, both the positive lens and the positive meniscus lens may be formed using the above low-dispersive glass so that a much superior imaging quality can be achieved. In the present invention, it has also been found that, for the purpose of good correction of aberrations, both the positive lens and the positive meniscus lens may preferably be formed using the glass having anomalous diffusion described above.

As for the negative lens group GR, it may preferably be constituted of, in order from the object side, a cemented lens consisting of combination of a positive meniscus lens, a biconcave lens and a positive meniscus lens. In other words, the negative lens group GR may preferably be a negative cemented lens consisting of three lenses. Also, in order to correct various aberrations, in particular, spherical aberration, it is effective for the negative lens group GR to have a positive lens with its convex surface facing the image side, whereby a good imaging quality can be achieved.

Such constitution is more effective especially when the afocal magnification M fulfills the following condition (7):

$$2.5 < M \tag{7}$$

This is because among various negatives the longitudinal chromatic aberration may occur especially in a large amount with an increase in the afocal magnification M, but the above constitution enables achievement of a well balanced chromatic aberration.

In the positive cemented lens in the positive lens group GF, the positive lens may be made to have a large Abbe number to make it low-dispersive and the negative lens may be made to have a small Abbe number to make it high-dispersive, whereby a sufficient axial achromatism can be achieved. Here, the Abbe number of the positive lens and that of the negative lens may preferably be set in a difference Δv of 10 or larger. In the case when the positive lens group GF has a plurality of positive lenses or negative lenses, the difference Δv may preferably be 10 or more at minimum.

Incorporation of the cemented lens also makes mutual decentration of lenses occur with difficulty at the time of production, so that qualities can be more kept from lowering because of an error in production. Thus, the incorporation of the cemented lens is preferable also from the viewpoint of production technology.

In the negative lens group GR, the use of a short flint type (KzF system of Schott Glas) anomalous-dispersive glass in any of constituent negative lenses also enables much superior chromatic correction.

Where the front tele-converter is mounted to the photo-taking lens on its object side, the original photo-taking lens has the characteristic of having an elongated minimum photo-taking distance. However, a mechanism may be provided by which at least one of the positive lens group GF and the negative lens group GR is movable along the optical axis.

This enables near-distance focusing advantageously. In the present invention, the negative lens group GR may be made up as a movable lens group which can be moved along the optical axis, thus a relatively simple structure can be set up, and also an inner focusing system can be employed in which the total length does not change at the time of focusing. This is advantageous.

As described previously, where the system has a focusing mechanism on the photo-taking lens side, the light ray which exit from the front tele-converter need not to be perfectly afocal, and may substantially be afocal within the range where the focusing can be made.

In addition, where the system has a focusing mechanism on the photo-taking lens side, it has a little long back focus when the front tele-converter is mounted, and this rather can make the system absorb changes in temperature or errors in production to enables sure infinite focusing, thus this is preferable from the viewpoint of production technology.

The front tele-converter of the present invention may further have, as described later, a vibration-detecting member for detecting any vibration of the photo-taking lens, a vibration control device for determining an appropriate amount of vibration correction in accordance with signals sent from the vibration-detecting member and signals sent from a control member for making control of a camera's operating sequence, and a drive mechanism for moving a vibration-reduction lens group in accordance with the amount of vibration correction, which are combined to make up a vibration-reduction lens system. In such a case, in the present invention, the system may preferably be so constructed that a small-sized negative lens group GR or a part thereof may shift in the direction falling at right angles with the optical axis.

Needless to say, much better optical qualities can be attained by further using an aspherical lens, a diffraction optical element, a gradient index lens and so forth for each lens constituting the front tele-converter of the present invention.

In order to obtain a practical tele-converter, it is insufficient for it to have an afocal magnification of 1.2 or 1.5 at best as in the prior art. The present inventors consider it desirable in view of practical use to ensure a sufficiently high afocal magnification, stated specifically, to ensure an afocal magnification of 1.9 or higher. Such an afocal magnification made higher may cause a great chromatic aberration if the lens is in a simple construction, to bring about a disadvantage of damaging picture quality. In the present invention, it has been discovered that such a disadvantage can be avoided by disposing the respective positive lens group GF and negative lens group GR appropriately so as to achieve a good correction of the chromatic aberration.

In order to make the front tele-converter have a small total length, it may preferably be an afocal converter of the Galilean type described above. Also, such an Galilean type afocal converter is well mountable to photo-taking lenses of cameras or the like because the posture of images does not change also when it is in the state of being mounted.

Meanwhile, the Keplerian type afocal converters in which a positive lens group and an additional positive lens group are combined is disadvantageous in that it has a large total length and the image is inverted up and down and right and left.

Now, in the present invention, it has been discovered that a good vibration-reduction quality can be attained where a vibration-reduction lens group GV comprising a lens group consisting of part or the whole of a negative lens group GR and having a negative refractive power, the negative lens group GR having a stated construction, is moved in the direction falling at substantially right angles with the optical axis. Also, stated specifically, a vibration-reduction lens system can be made up by combination of a vibration-detecting member for detecting any vibration of a photo-taking lens, a vibration control device for determining an appropriate amount of vibration correction in accordance with signals sent from the vibration-detecting member and signals sent from a control member for making control of a camera's operating sequence, and a drive mechanism for moving a vibration-reduction lens group in accordance with the amount of vibration correction.

The present invention will be described below in greater detail with reference to specific conditions.

In the present invention, the positive lens group GF has a positive cemented lens, the negative lens group GR has a cemented lens comprising a positive lens with its convex surface facing the image side, and the lens groups fulfill the following conditions (8) and (9):

$$\Delta S/|fV| < 0.2 \qquad (8)$$

$$0.1 < |fV|/fF < 5.0 \qquad (9)$$

wherein $\Delta S$ represents the maximum amount of movement of the vibration-reduction lens group GV at the time of vibration reduction, in the direction falling at substantially right angles with the optical axis; fV represents a focal length of the vibration-reduction lens group GV; and fF, a focal length of the positive lens group GF.

The condition (8) specifies an appropriate range for the proportion of the maximum amount $\Delta S$ of movement of the vibration-reduction lens group GV to the magnitude $|fV|$ of a focal length of the vibration-reduction lens group GV. Incidentally, the action of vibration reduction can not be obtained if the vibration-reduction lens group GV does not move at all, and hence, as a matter of course, $\Delta S > 0$.

If the value is greater than the upper-limit value of the condition (8), the vibration-reduction lens group GV moves in a too large amount at the time of vibration reduction, so that aberrations may vary in a large amount at the time of vibration reduction disadvantageously. In particular, in the peripheral region on an imaging plane, a difference between the best imaging plane in the meridional direction and the best imaging plane in the sagittal direction along the optical axis may greatly differ disadvantageously. Also, in the peripheral region on an imaging plane, especially the chromatic aberration of magnification and decentration coma may greatly occur disadvantageously. In order to bring out the effect of the present invention sufficiently, the upper-limit value of the condition (8) may more preferably be set to be 0.05.

The condition (9) specifies an appropriate range for the proportion of the magnitude $|fv|$ of a focal length of the vibration-reduction lens group GV to the focal length fF of the positive lens group GF. Incidentally, the vibration-reduction lens group GV has a negative refractive power, and hence fF<0.

If the value is greater than the upper-limit value of the condition (9), the vibration-reduction lens group GV moves in a large amount at the time of vibration reduction, so that not only a disadvantage may be brought about such that the lens aperture tends to have to be made large in order to ensure a given quantity of light, but also the mechanism itself is complicated disadvantageously.

If the value is smaller than the lower-limit value of the condition (9), the vibration-reduction lens group GV has a too strong refractive power, so that aberrations may vary in a large amount at the time of vibration reduction, and especially the image plane tends to lose its flatness, resulting in a low imaging quality. As the result, picture quality around the imaging plane may lower disadvantageously.

In order to bring out the effect of the present invention sufficiently, the upper-limit value of the condition (9) may more preferably be set to be 0.8, and the lower-limit value, 0.2.

In the present invention, the lens groups may preferably fulfill the following conditions (10) and (11):

$$\Delta S/\Phi F < 0.2 \quad (10)$$

$$2.0 < \Phi F/\Phi R < 10.0 \quad (11)$$

wherein ΦF represents an effective aperture (diameter) of a lens surface of the positive lens group GF on its side closest to the object side; and ΦR, an effective aperture of a lens surface of the negative lens group GR on its side closest to the object side.

The condition (10) specifies an appropriate range for the proportion of the maximum amount ΔS of movement of the vibration-reduction lens group GV to the effective aperture ΦF of a lens surface of the positive lens group GF on its side closest to the object side. Incidentally, like the case of the condition (8), ΔS>0.

If its value is greater than the upper-limit value of the condition (10), the vibration-reduction lens group GV moves in a too large amount ΔS with respect to the effective aperture ΦF at the time of vibration reduction, so that not only the image plane may have a poor flatness but also stray light tends to mix to make picture quality greatly poor undesirably.

In order to bring out the effect of the present invention sufficiently, the upper-limit value of the condition (10) may more preferably be set to be 0.05.

The condition (11) specifies an appropriate range for the proportion of the effective aperture ΦF of a lens surface of the positive lens group GF on its side closest to the object side to the effective aperture ΦR of a lens surface of the negative lens group GR on its side closest to the object side. This condition (11) specifies the diameter of a light ray that passes through the positive lens group GF which is a front group of the front tele-converter and the focal length of the negative lens group GR which is a rear group, and is a condition important for selectively passing light rays necessary to obtain a sufficiently good image and also for controlling the refractive power of the rear group negative lens group GR within a proper range.

Its value greater than the upper-limit value of the condition (11) is undesirable because the lens surface has a too large effective aperture ΦF, so that light rays pass through the rear group negative lens group GR at a high position, to greatly cause aberrations. In addition, tray light tends to enter the optical system to not only tend to cause ghost or flare but also enlarge the front cell diameter to make the optical system have a larger size and make it have a greater weight undesirably. Its value which on the other hand is smaller than the lower-limit value of the condition (11) is undesirable because the lens surface has a too small effective aperture ΦF to attain a sufficient quantity of rim light, undesirably.

In order to bring out the effect of the present invention sufficiently, the upper-limit value of the condition (11) may preferably be 8.0, and the lower-limit value, 2.5.

In the present invention, the positive lens group GF may preferably have a positive cemented lens consisting of combination of a negative meniscus lens disposed closest to the object side and a positive lens, the negative lens group GR has a positive lens disposed closest to the object side and a biconcave lens disposed on the image side of the positive lens, and the lens groups fulfill the following condition (12):

$$0.03 < \Phi R/fF < 1.0 \quad (12)$$

The condition (12) specifies an appropriate range for the proportion of the effective aperture ΦR of a lens surface of the negative lens group GR on its side closest to the object side to the focal length fF of the positive lens group GF.

Its value greater than the upper-limit value of the condition (12) is undesirable because the negative lens group GR has a too small focal length fF, so that the spherical aberration caused in the tele-converter may seriously occur to damage picture quality. Such a value is also not undesirable because, when the positive lens group GF is assembled to a barrel, any decentration may so greatly affect optical quality as to make production difficult.

Its value which on the other hand is smaller than the lower-limit value of the condition (12) is undesirable because the positive lens group GF may have so large a focal length fF that the tele-converter has a large total length. Such a value is also undesirable because an excessive longitudinal chromatic aberration may result to damage picture quality. Such a value is still also undesirable because a large front cell diameter may result in an attempt to provide rim light in an amount beyond a certain level.

In order to bring out the effect of the present invention sufficiently, the upper-limit value of the condition (12) may more preferably be 0.5, and the lower-limit value, 0.1.

In the present invention, it has been found that the above condition (12) is effective when the afocal magnification is higher than 1.9. It has also been found that, in order to ensure a good imaging quality, it is important for the negative lens group GR to have a positive lens.

In particular, it is important for the negative lens group GR to have a positive lens in order to well correct the Petzval sum when a good flatness of the imaging plane is ensured.

Now, in the present invention, in order to achieve a good imaging quality, the positive cemented lens in the positive lens group GF may preferably be constituted of, in order from the object side, combination of a negative meniscus lens with its convex surface facing the object side and a positive lens. When the front tele-converter is mounted to a master lens (photo-taking lens), a chromatic aberration caused in the tele-converter is added to a chromatic aberration of only the master lens.

Hence, the above constitution of the positive cemented lens is important especially for sufficient axial achromatism in the synthesized optical system of the master lens and the tele-converter. Also, the positive lens constituting the positive cemented lens can well correct a spherical aberration and a coma of light ray on the side lower than the principal ray (a lower coma), and hence, the positive cemented lens constituted as described above is an important requirement for achieving a good imaging quality.

In the present invention, the vibration-reduction lens group GV may also comprise, in order from the object side, a cemented lens consisting of combination of a positive lens with its convex surface facing the image side and a biconcave lens, and the lens groups fulfill the following condition (13):

$$0.000001 < (\Delta S)^2/DFR.\Phi V < 0.01 \quad (13)$$

wherein ΦV represents an effective aperture of a lens surface of the vibration-reduction lens group GV on its side closest to the object side; and DFR, an air gap between the positive lens group GF and the negative lens group GR along the optical axis (axial air gap).

Its value greater than the upper-limit value of the condition (13) is undesirable because the ΔS is too large with respect to the axial air gap DFR and effective aperture ΦV, i.e., the vibration-reduction lens group GV moves in a too large amount, so that aberrations may vary in a large amount at the time of vibration reduction.

In particular, in the peripheral region on an imaging plane, a difference between the best imaging plane in the meridional direction and the best imaging plane in the sagittal direction along the optical axis may greatly differ undesirably.

Its value which on the other hand is smaller than the lower-limit value of the condition (13) is undesirable because a large axial air gap DFR tends to result to provide a large total length.

Such a value is also undesirable because the negative lens group GR tends to have a large effective aperture ΦV to make stray light tend to mix at the time of vibration reduction. In order to bring out the effect of the present invention sufficiently, the upper-limit value of the condition (13) may more preferably be 0.001, and the lower-limit value, 0.00001.

In addition, since in the present invention the afocal magnification is higher than 1.9, in order to effect sufficient achromatism the positive lens group GF may preferably have at least one lens formed of a special low-dispersive glass. Stated more specifically, the positive lens group GF may preferably have at least one lens formed of an optical glass having what is called an Abbe number υd of 65 or more. Such constitution enables sufficient correction of not only longitudinal chromatic aberration but also chromatic aberration of magnification to achieve a good imaging quality. The positive lens group GF may have at least one lens formed of an optical glass having an Abbe number υd of 80 or more, whereby the chromatic aberration can corrected in a more desirable state.

The positive lens group GF may further preferably have at least one lens formed of an optical glass having anomalous dispersion. This is very important for making the tele-converter have a high magnification.

In the present invention, it has been found that in order to effect sufficient achromatism it is very effective to use for the positive lens in the positive lens group GF an optical glass having an Abbe number υd of 80 or more and a relative partial dispersion P(gFdC) of 0.8 or more. It has also been found that forming the positive lens in the positive lens group GF by the use of the special low-dispersive glass is more preferable because the effect of achromatism as the cemented lens can sufficiently be brought out. Also, a good achromatic action can be attained also when the special low-dispersive glass is used for any of the positive lenses in the positive lens group GF. Thus, effecting sufficient achromatism is important for ensuring a good imaging quality at the time of vibration reduction.

In the present invention, in addition to the above constitution, in order to attain much better imaging quality and vibration-reduction quality the lens groups may preferably fulfill the following conditions (14) to (17):

$$1.6 < N \quad (14)$$

$$45 > \nu \quad (15)$$

$$0.15 < \text{fF.M/DFR} < 10.0 \quad (16)$$

$$-2.0 < (RB-RA)/(RB+RA) < 2.0 \quad (17)$$

wherein N represents a refractive index to the d-line of a negative lens in the vibration-reduction lens group GV (when it has a plurality of negative lenses, their average value is found); ν represents an Abbe number of a positive lens in the vibration-reduction lens group GV (when it has a plurality of positive lenses, their average value is found); M represents an afocal magnification of the tele-converter; RA represents a radius of curvature of an object-side surface of a positive lens in the negative lens group GR on its side closest to the object side; and RB represents a radius of curvature of an image-side surface of the positive lens in the negative lens group GR on its side closest to the object side.

In the condition (14), a value lower than its lower-limit value is undesirable because the negative lens has so small a refractive index N that Petzval sum tends to be on the negative side, so that, among various aberrations, particularly the imaging plane tends to be curved greatly to damage picture quality.

In the condition (15), a value greater than its upper-limit value is undesirable because no sufficient achromatism in the vibration-reduction lens group GV may be achievable to make it difficult to achieve a good picture quality. In particular, such a value is undesirable because the longitudinal chromatic aberration can not sufficiently be corrected.

In the condition (16), a value greater than its upper-limit value is undesirable because the positive lens group GF has a too large focal length fF corresponding to the afocal magnification M, so that not only the tele-converter has a large total length, but also the spherical aberration and longitudinal chromatic aberration may greatly occur. Such a value is also not undesirable because a large front cell diameter tends to result to not only make the optical system have a larger size but also make it have a greater weight.

Its value which on the other hand is smaller than the lower-limit value of the condition (16) is undesirable because the positive lens group GF may have so small a focal length fF as to not only make imaging plane curvature large but also cause a great coma of light rays on the side lower than the principal ray, to damage picture quality similarly. Such a value is also not undesirable because a large axial gap DFR may result, so that the tele-converter has a large total length.

In order to bring out the effect of the present invention sufficiently, the upper-limit value of the condition (16) may preferably be 9.0, and the lower-limit value, 5.0.

The condition (17) specifies an appropriate range for a shape factor (SF) of the positive meniscus lens in the negative lens group GR on its side closest to the object side. The shape factor is a parameter that shows the shape of a lens. The lens shape becomes biconcave or meniscus-shaped according to this value.

Its value greater than the upper-limit value of the condition (17) is undesirable because the above positive meniscus lens has so large a shape factor as to cause a great coma of light rays on the side lower than the principal ray. Such a value is also undesirable because the lens shape may make it difficult to manufacture lenses. Such a value is still also undesirable because a disadvantage is brought about such that ghost or flare due to surface reflection may greatly occur.

Its value which on the other hand is lower than the lower-limit value of the condition (17) is undesirable because the above positive meniscus lens has so small a shape factor as to cause a great spherical aberration on the positive side. Such a value is also undesirable because the surface on the object side is so close to a flat surface as to bring about disadvantages that ghost or flare due to surface reflection tends to occur and picture quality is damaged.

In order to bring out the effect of the present invention more sufficiently, the upper-limit value of the condition (17) may preferably be 0.5, and the lower-limit value, −0.5.

When the tele-converter is actually set up, it is preferable for much better imaging quality that the positive lens group GF is constituted of, in order from the object side, i) a positive cemented lens consisting of combination of a negative meniscus lens with its convex surface facing the object side and a positive lens and ii) a positive meniscus lens with its convex surface facing the object side. In the case when the afocal magnification is higher than 2.5, at least one lens of the positive lens and the positive meniscus lens in the positive lens group GF may preferably be formed of a low-dispersive glass having an Abbe number υd of 80 or more. Of course, both the positive lens and the positive meniscus lens may be formed using the low-dispersive glass so that a much superior imaging quality can be achieved. It has also been found that, for the purpose of achieving good correction of chromatic aberration, both the positive lens and the positive meniscus lens may preferably be formed using the glass having anomalous diffusion described above.

Similarly, in the case when the afocal magnification is higher than 2.5, the negative lens group GR may preferably be a triplet cemented lens consisting of combination of, in order from the object side, a positive meniscus lens, a biconcave lens and a positive meniscus lens. This is because among various aberrations the longitudinal chromatic aberration may occur especially in a large amount with an increase in the afocal magnification M. Such constitution enables achievement of a well balanced chromatic aberration.

In the case when the afocal magnification is lower than 2.5, the negative lens group GR may be constituted of a doublet cemented lens consisting of combination of, in order from the object side, a positive lens and a biconcave lens.

In either case, in the cemented lens, the positive lens may be made to have a large Abbe number to make it low-dispersive and the negative lens may be made to have a small Abbe number to make it high-dispersive, whereby a sufficient axial achromatism can be achieved.

Here, the Abbe number of the positive lens and that of the negative lens may preferably be set in a difference Δv of 10 or larger. In the case when the negative lens group GR has a plurality of positive lenses or a plurality of negative lenses, their respective minimum Abbe numbers should be used when the difference Δv is calculated.

Incorporation of the cemented lens also makes mutual decentration of lenses occur with difficulty at the time of production, so that qualities can be more kept from lowering because of an error in production. Thus, the incorporation of the cemented lens is preferable also from the viewpoint of production technology.

In the negative lens group GR, too, the use of a short flint type (KzF system of Schott Glas) anomalous-dispersive glass in any of constituent negative lenses also enables much superior chromatic correction.

Where the front tele-converter is mounted to the photo-taking lens on its object side, the original photo-taking lens has the characteristic of having an elongated minimum photo-taking distance. However, a mechanism may be provided by which at least one of the positive lens group GF and the negative lens group GR is movable along the optical axis.

This enables near-distance focusing advantageously. In the present invention, the negative lens group GR may be made up as a movable lens group which can be moved along the optical axis, thus a relatively simple structure can be set up, and also an inner focusing system can be employed in which the total length does not change at the time of focusing. This is advantageous.

Without limitation to the use in vibration correction, the present invention may also be applied in combination with a slow shatter or a slow synchronizer. This enables proper exposure even under conditions where it is considered difficult to take photographs. Also, needless to say, to the respective lenses constituting the front tele-converter of the present invention, an aspherical lens, a diffraction optical element, a gradient index lens or the like may further be added, whereby much better optical qualities can be achieved.

It is also possible to dispose a reflecting mirror in the optical path between the positive lens group GF and the negative lens group GR to bend the optical path so that the whole tele-converter can be made compact.

Specific embodiments of the present invention will be described below with reference to the accompanying drawings.

In all Embodiments, front tele-converter TC of the present invention are each constituted of the positive lens group GF having a positive refractive power and the negative lens group GR having a negative refractive power. Also, photo-taking lenses L to which the front tele-converter TC is mounted are common in all Embodiments.

First Embodiment

FIG. 1 illustrates the lens construction of a synthesized optical system consisting of a front tele-converter and a photo-taking lens, according to First Embodiment of the present invention.

In the front tele-converter TC of First Embodiment, the positive lens group GF is constituted of, in order from the object side, a positive cemented lens consisting of combination of a negative meniscus lens with its convex surface facing the object side and a biconvex lens, and a positive meniscus lens with its convex surface facing the object side. Also, the negative lens group GR is constituted of a negative cemented lens consisting of combination of a positive meniscus lens with its concave surface facing the object side (with its convex surface facing the image side), a biconcave lens and a positive meniscus lens with its convex surface facing the object side.

The photo-taking lens L is constituted of, in order from the object side, a negative meniscus lens with its convex surface facing the object side, a biconcave lens, a positive meniscus lens with its convex surface facing the object side, an aperture stop S, a biconvex lens, a cemented lens of a biconvex lens and a biconcave lens, a positive meniscus lens with its concave surface facing the object side, a positive meniscus lens with its convex surface facing the object side, and a biconvex lens.

Incidentally, a protective glass F1 is disposed in the optical path extending between the front tele-converter TC and the negative meniscus lens of the photo-taking lens L on its side closest to the object side. Also, in the optical path extending between the biconvex lens of the photo-taking lens L on its side closest to the image side and an imaging plane, two plane-parallel plates F2 and F3 are disposed as filters.

Factorial values of First Embodiment of the present invention are listed in Table 1 below.

In Table 1, letter symbol F represents a focal length of the synthesized optical system; and f represents a focal length of the photo-taking lens L. Also, in lens factors in Table 1, in order from the left side, the number shows surface numbers of lens surfaces viewed from the object side. Letter symbol r represents a radius of curvature; d represents a gap between lens surfaces; υ represents an Abbe number; N(d) represents a refractive index to the d-line (λ=587.6 nm); and N(g) represents a refractive index to the g-line (λ=435.8 nm). The refractive index of the air, i.e. 1.000000 is omitted.

Further, the letter symbols "(GF)" etc. next to the surface numbers represents the lens group, and is described at the first lens surface of the lens group. Similarily, the letter symbol "(S)" represents the aperture stop, and is described at surface number of the aperture stop. The same applies hereinafter in the data tables of all Embodiments.

TABLE 1

(Whole factors)
F = 68.433
(Lens factors)

| | r | d | ν | N (d) | N (g) |
|---|---|---|---|---|---|
| 1 (GF) | 108.5252 | 2.7000 | 25.43 | 1.805180 | 1.847290 |
| 2 | 66.7410 | 10.3000 | 81.61 | 1.497000 | 1.504510 |
| 3 | −666.9212 | 0.3000 | | | |
| 4 | 41.1762 | 10.3000 | 81.61 | 1.497000 | 1.504510 |
| 5 | 113.2884 | 42.6851 | | | |
| 6 (GR) | −275.5622 | 2.7000 | 31.07 | 1.688930 | 1.717970 |
| 7 | −27.5080 | 1.5000 | 42.72 | 1.834810 | 1.859530 |
| 8 | 12.2878 | 3.2000 | 29.23 | 1.721510 | 1.753990 |
| 9 | 43.6360 | 4.0000 | | | |
| 10 (F1) | ∞ | 1.0000 | 64.10 | 1.516800 | 1.526703 |
| 11 | ∞ | 3.0347 | | | |
| 12 | 24.4828 | 1.3000 | 46.58 | 1.804000 | 1.825700 |
| 13 | 9.0381 | 2.7500 | | | |
| 14 | −64.2224 | 1.1000 | 60.29 | 1.620410 | 1.633150 |
| 15 | 16.6428 | 0.6000 | | | |
| 16 | 13.2531 | 2.5000 | 23.78 | 1.846660 | 1.894190 |
| 17 | 31.0852 | 3.0129 | | | |
| 18 (S) | ∞ | 1.0000 | | | |
| 19 | 25.8727 | 2.2000 | 46.58 | 1.804000 | 1.825700 |
| 20 | −53.1027 | 0.2000 | | | |
| 21 | 10.8558 | 3.9000 | 44.89 | 1.639300 | 1.657400 |
| 22 | −16.3258 | 4.0000 | 26.30 | 1.784700 | 1.824280 |
| 23 | 8.2972 | 0.9000 | | | |
| 24 | 104.5327 | 1.9500 | 70.24 | 1.487490 | 1.495960 |
| 25 | −30.4589 | 4.4500 | | | |
| 26 | 16.9876 | 2.2500 | 39.59 | 1.804400 | 1.830340 |
| 27 | 41.3698 | 20.5395 | | | |
| 28 | 132.1518 | 2.5000 | 57.44 | 1.606020 | 1.619100 |
| 29 | −36.4729 | 1.0000 | | | |
| 30 (F2) | ∞ | 2.7600 | 67.85 | 1.458504 | 1.466735 |
| 31 | ∞ | 1.4410 | | | |
| 32 (F3) | ∞ | 0.5000 | 64.10 | 1.516800 | 1.526703 |
| 33 | ∞ | 1.3280 | | | |

Condition-Corresponding Values)

fF=87.148 fR=28.092

ΦF=56.84

ΦR=14.08

DFR=42.685

Δν=11.65

Relative Partial Dispersion P of Biconvex Lens

P(g F d C)=1.232

Relative Partial Dispersion P of Positive Meniscus Lens

P(gFdC)=1.232

ΦF/|fR|=2.023     (1)

ΦR/fF=0.162      (2)

fF·M/DFR=6.084    (3)

nd=1.83481       (4)

N=1.70522        (5)

(RB+RA)/(RB−RA)=−0.38246    (6)

M=2.980         (7)

FIGS. 2A to 2D are diagrams showing various aberrations of the synthesized optical system in First Embodiment.

In the respective aberration diagrams, FNO represents an F number; Y represents an image height; d represents the d-line (λ=587.6 nm); and g represents the g-line (λ=435.8 ). Also, in the aberration diagram showing astigmatism, a solid line shows a sagittal image surface; and a broken line shows a meridional image surface.

The same applies hereinafter in the aberration diagrams of all Embodiments.

As can be seen from the aberration diagrams, in First Embodiment, various aberrations are well corrected and a superior imaging quality is ensured, though the tele-converter has a high magnification (M=2.980).

Second Embodiment

Figure 3:
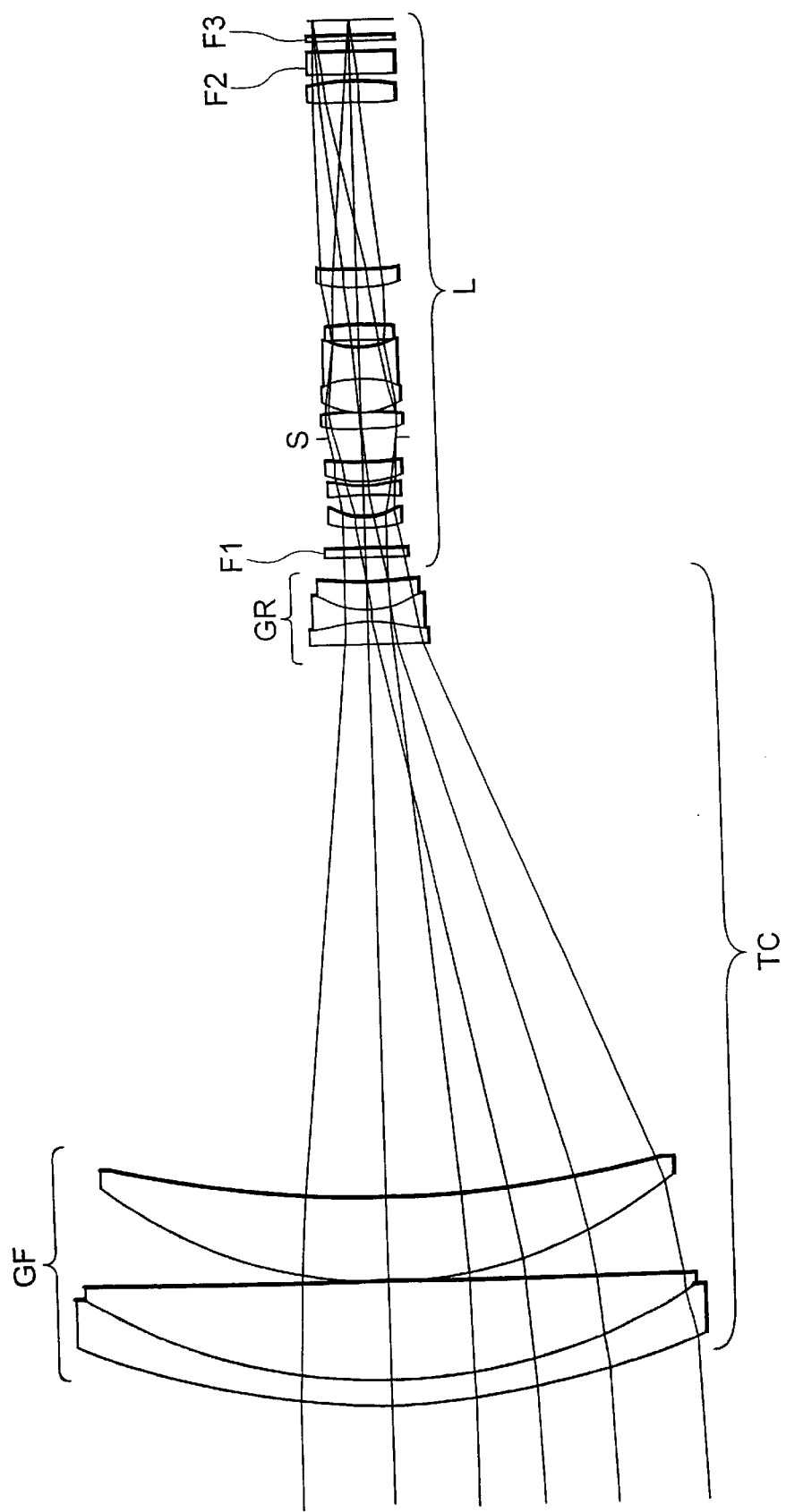
FIG. 3 illustrates the lens construction of a synthesized optical system consisting of a front tele-converter TC and a photo-taking lens L, according to Second Embodiment.

FIG. 3 illustrates the lens construction of a synthesized optical system consisting of a front tele-converter and a photo-taking lens, according to Second Embodiment of the present invention.

In the front tele-converter TC of Second Embodiment, the positive lens group GF is constituted of, in order from the object side, a positive cemented lens consisting of combination of a negative meniscus lens with its convex surface facing the object side and a positive meniscus lens with its convex surface facing the object side, and a positive meniscus lens with its convex surface facing the object side. Also, the negative lens group GR is constituted of a negative cemented lens consisting of combination of a positive meniscus lens with its concave surface facing the object side (with its convex surface facing the image side), a biconcave lens and a positive meniscus lens with its convex surface facing the object side. The photo-taking lens L is constituted in entirely the same manner as in First Embodiment.

Factorial values of Second Embodiment of the present invention are listed in Table 2 below.

TABLE 2

(Whole factors)
F = 90.880
(Lens factors)

| | r | d | ν | N (d) | N (g) |
|---|---|---|---|---|---|
| 1 (GF) | 100.9578 | 3.0000 | 25.43 | 1.805180 | 1.847290 |
| 2 | 70.7109 | 12.0000 | 81.61 | 1.497000 | 1.504510 |
| 3 | 1593.6451 | 0.3000 | | | |
| 4 | 56.7590 | 10.0000 | 81.61 | 1.497000 | 1.504510 |
| 5 | 139.2076 | 69.6980 | | | |
| 6 (GR) | −123.1380 | 2.5000 | 31.07 | 1.688930 | 1.717970 |
| 7 | −34.9113 | 1.5000 | 42.72 | 1.834810 | 1.859530 |
| 8 | 13.4025 | 3.2000 | 29.23 | 1.721510 | 1.753990 |
| 9 | 46.8058 | 3.4516 | | | |
| 10 (F1) | ∞ | 1.0000 | 64.10 | 1.516800 | 1.526703 |
| 11 | ∞ | 2.7868 | | | |
| 12 | 24.4828 | 1.3000 | 46.58 | 1.804000 | 1.825700 |
| 13 | 9.0381 | 2.7500 | | | |
| 14 | −64.2224 | 1.1000 | 60.29 | 1.620410 | 1.633150 |
| 15 | 16.6428 | 0.6000 | | | |
| 16 | 13.2531 | 2.5000 | 23.78 | 1.846660 | 1.894190 |
| 17 | 31.0852 | 3.0129 | | | |
| 18 (S) | ∞ | 1.0000 | | | |
| 19 | 25.8727 | 2.2000 | 46.58 | 1.804000 | 1.825700 |
| 20 | −53.1027 | 0.2000 | | | |
| 21 | 10.8558 | 3.9000 | 44.89 | 1.639300 | 1.657400 |
| 22 | −16.3258 | 4.0000 | 26.30 | 1.784700 | 1.824280 |
| 23 | 8.2972 | 0.9000 | | | |
| 24 | 104.5327 | 1.9500 | 70.24 | 1.487490 | 1.495960 |
| 25 | −30.4589 | 4.4500 | | | |
| 26 | 16.9876 | 2.2500 | 39.59 | 1.804400 | 1.830340 |
| 27 | 41.3698 | 20.5395 | | | |
| 28 | 132.1518 | 2.5000 | 57.44 | 1.606020 | 1.619100 |
| 29 | −36.4729 | 1.0000 | | | |
| 30 (F2) | ∞ | 2.5900 | 64.10 | 1.516800 | 1.526703 |
| 31 | ∞ | 1.5000 | | | |

TABLE 2-continued (Whole factors)
F = 90.880
(Lens factors)

|  | r | d | ν | N (d) | N (g) |
|---|---|---|---|---|---|
| 32 (F3) | ∞ | 0.7500 | 64.10 | 1.516800 | 1.526703 |
| 33 | ∞ | 1.4111 | | | |

Condition-Corresponding Values)

fF=116.064 fR=28.908

ΦF=86

ΦR=13.23

DFR=69.698

Δν=11.65

Relative Partial Dispersion P of Biconvex Lens

P(gFdC)=1.232

Relative Partial Dispersion P of Positive Meniscus Lens

P(gFdC)=1.232

| ΦF/|fR|=2.975 | (1) |
| ΦR/fF=0.114 | (2) |
| fF.M/DFR=6.649 | (3) |
| nd=1.83481 | (4) |
| N=1.70522 | (5) |
| (RB+RA)/(RB−RA)=−0.44519 | (6) |
| M=3.993 | (7) |

In all Embodiments, the photo-taking lens L has a focal length of f=23.380.

FIGS. 4A to 4D are diagrams showing various aberrations of the synthesized optical system in Second Embodiment.

As can be seen from the aberration diagrams, in Second Embodiment, various aberrations are well corrected and a superior imaging quality is ensured, though the tele-converter has a high magnification (M=3.993).

In the following Embodiments, aspherical surface is expressed by the following equation (c) where a height in the direction perpendicular to the optical axis is represented by y; a distance (amount of sag) along the optical axis from a tangent plane at the vertex of the aspherical surface to a position above the aspherical surface at a height y, is represented by z; a conical coefficient is represented by K; and an nth-order aspherical coefficient is represented by Cn:

$$Z=(y^2/r)/\{1+(1-k\cdot y^2/r^2)^{1/2}\}$$
$$+C_4\cdot y^4+C_6\cdot y^6+C_8\cdot y^8+C_{10}\cdot y^{10} \quad (c)$$

In all the following Embodiments, the lens surface formed in an aspherical shape is marked with an asterisk (*) on the right side of the surface number.

Third Embodiment

Figure 5:
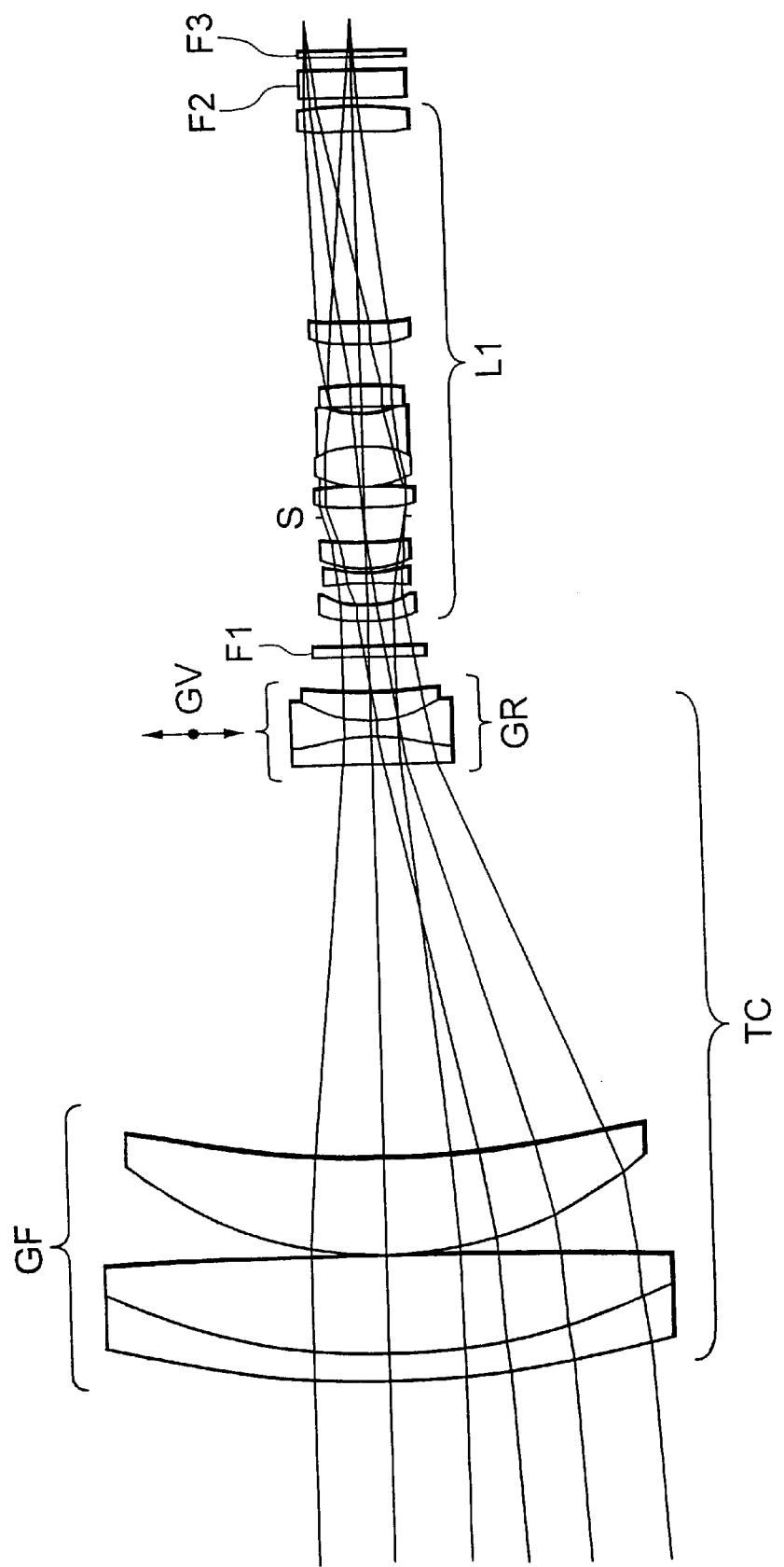
FIG. 5 illustrates the lens construction of a synthesized optical system consisting of a front tele-converter TC and a photo-taking lens L1, according to Third Embodiment.

FIG. 5 illustrates the lens construction of a synthesized optical system consisting of a front tele-converter TC and a photo-taking lens L1, according to Third Embodiment of the present invention.

In the front tele-converter TC of Third Embodiment, the positive lens group GF is constituted of, in order from the object side, a positive cemented lens consisting of combination of a negative meniscus lens with its convex surface facing the object side and a biconvex lens, and a positive meniscus lens with its convex surface facing the object side. Also, the negative lens group GR is constituted of a negative cemented lens consisting of combination of a positive meniscus lens with its concave surface facing the object side (with its convex surface facing the image side), a biconcave lens and a positive meniscus lens with its convex surface facing the object side.

The photo-taking lens L1 is constituted of, in order from the object side, a negative meniscus lens with its convex surface facing the object side, a biconcave lens, a positive meniscus lens with its convex surface facing the object side, an aperture stop S, a biconvex lens, a cemented lens of a biconvex lens and a biconcave lens, a positive meniscus lens with its concave surface facing the object side, a positive meniscus lens with its convex surface facing the object side, and a biconvex lens.

Incidentally, a protective glass F1 is disposed in the optical path extending between the front tele-converter TC and the negative meniscus lens of the photo-taking lens L on its side closest to the object side. Also, in the optical path extending between the biconvex lens of the photo-taking lens L1 on its side closest to the image side and an imaging plane, two plane-parallel plates F2 and F3 are disposed as filters.

At the time of vibration reduction, a vibration-reduction lens group GV consisting of the whole of the negative lens group GR is moved in the direction falling at right angles with the optical axis to correct variations of image position which are caused by, e.g., a shake of hand, vibration and so on.

Factorial values of Third Embodiment of the present invention are listed in Table 3 below. In "whole factors" in Table 3, letter symbol F represents a focal length of the synthesized optical system; and f represents a focal length of the photo-taking lens L1.

In "vibration-reduction data" in Table 3, ΔY represents the amount of movement of an image with respect to a maximum amount of movement ΔS of the vibration-reduction lens group GV. Here, when the sign (plus or minus) of ΔS and the sign of ΔY are identical, the direction of movement of the vibration-reduction lens group GV and the direction of movement of the image are identical.

On the other hand, when the sign of ΔS and the sign of ΔY are different, the direction of movement of the vibration-reduction lens group GV and the direction of movement of the image are opposite.

TABLE 3

(Whole factors)
F = 68.434
f = 23.380
(Lens factors)

| Surface number | r | d | N (d) | N (g) |
|---|---|---|---|---|
| 1 (GF) | 108.52521 | 2.70000 | 1.805180 | 1.847290 |
| 2 | 66.74100 | 10.30000 | 1.497000 | 1.504510 |
| 3 | −666.92125 | 0.30000 | | |
| 4 | 41.17624 | 10.30000 | 1.497000 | 1.504510 |

TABLE 3-continued (Whole factors)
F = 68.434
f = 23.380
(Lens factors)

| Surface number | r | d | N (d) | N (g) |
|---|---|---|---|---|
| 5 | 113.28839 | 42.68506 | | |
| 6 (GR) | −275.56220 | 2.70000 | 1.688930 | 1.717970 |
| 7 | −27.50800 | 1.50000 | 1.834810 | 1.859530 |
| 8 | 12.28780 | 3.20000 | 1.721510 | 1.753990 |
| 9 | 43.63601 | 4.00000 | | |
| 10 (F1) | ∞ | 1.00000 | 1.516800 | 1.526703 |
| 11 | ∞ | 3.03473 | | |
| 12 | 24.48279 | 1.30000 | 1.804000 | 1.825700 |
| 13 | 9.03807 | 2.75000 | | |
| 14 | −64.22243 | 1.10000 | 1.620410 | 1.633150 |
| 15 | 16.64281 | 0.60000 | | |
| 16 | 13.25307 | 2.50000 | 1.846660 | 1.894190 |
| 17 | 31.08525 | 3.01286 | | |
| 18 (S) | ∞ | 1.00000 | | |
| 19 | 25.87268 | 2.20000 | 1.804000 | 1.825700 |
| 20 | −53.10268 | 0.20000 | | |
| 21 | 10.85583 | 3.90000 | 1.639300 | 1.657400 |
| 22 | −16.32580 | 4.00000 | 1.784700 | 1.824280 |
| 23 | 8.29724 | 0.90000 | | |
| 24 | 104.53267 | 1.95000 | 1.487490 | 1.495960 |
| 25 | −30.45893 | 4.45000 | | |
| 26 | 16.98763 | 2.25000 | 1.804400 | 1.830340 |
| 27 | 41.36981 | 20.53954 | | |
| 28 | 132.15180 | 2.50000 | 1.606020 | 1.619100 |
| 29* | −36.47286 | 1.00000 | | |
| 30 (F2) | ∞ | 2.76000 | 1.458504 | 1.466735 |
| 31 | ∞ | 1.44100 | | |
| 32(F3) | ∞ | 0.50000 | 1.516800 | 1.526703 |
| 33 | ∞ | 1.32802 | | |

Aspherical Surface Data 29 surface r=−36.47286 k=1.0000

$C_4=1.77180 \times 10^{-4}$  $C_6=1.16710 \times 10^{-6}$ $C_8=-3.79980 \times 10^{-8}$  $C_{10}=4.24800 \times 10^{-10}$ Vibration-Reduction Data

ΔS+0.2

ΔY−0.1596

Condition-Corresponding Values

ΔS+0.2

ΔY−0.1596 fV=−29.092 fF=87.148 fR=28.092

ΦF=56.84

ΦR=14.08

DFR=42.685

Φv=11.06

M=2.934

| | |
|---|---|
| ΔS/\|fV\|=0.00688 | (1) |
| \|fV\|/fF\|=0.334 | (2) |
| ΔS/ΦF=0.00352 | (3) |
| ΦF/ΦR=4.04 | (4) |
| ΦR/fF=0.162 | (5) |
| (ΔS)²/DFR·ΦV=0.000085 | (6) |
| N=1.93491 | (7) |
| ν=31.07 | (8) |
| fF·M/DFR=5.9902 | (9) |
| (RB+RA)/(RB−RA)=−0.818 | (10) |

FIGS. 6A to 6E are diagrams showing various aberrations of the synthesized optical system in Third Embodiment.

As can be seen from the aberration diagrams, in Third Embodiment, various aberrations inclusive of those at the time of vibration reduction are well corrected and a superior imaging quality and a superior vibration-reduction quality are ensured, though the tele-converter has a high magnification (M=2.934).

Fourth Embodiment

Figure 7:
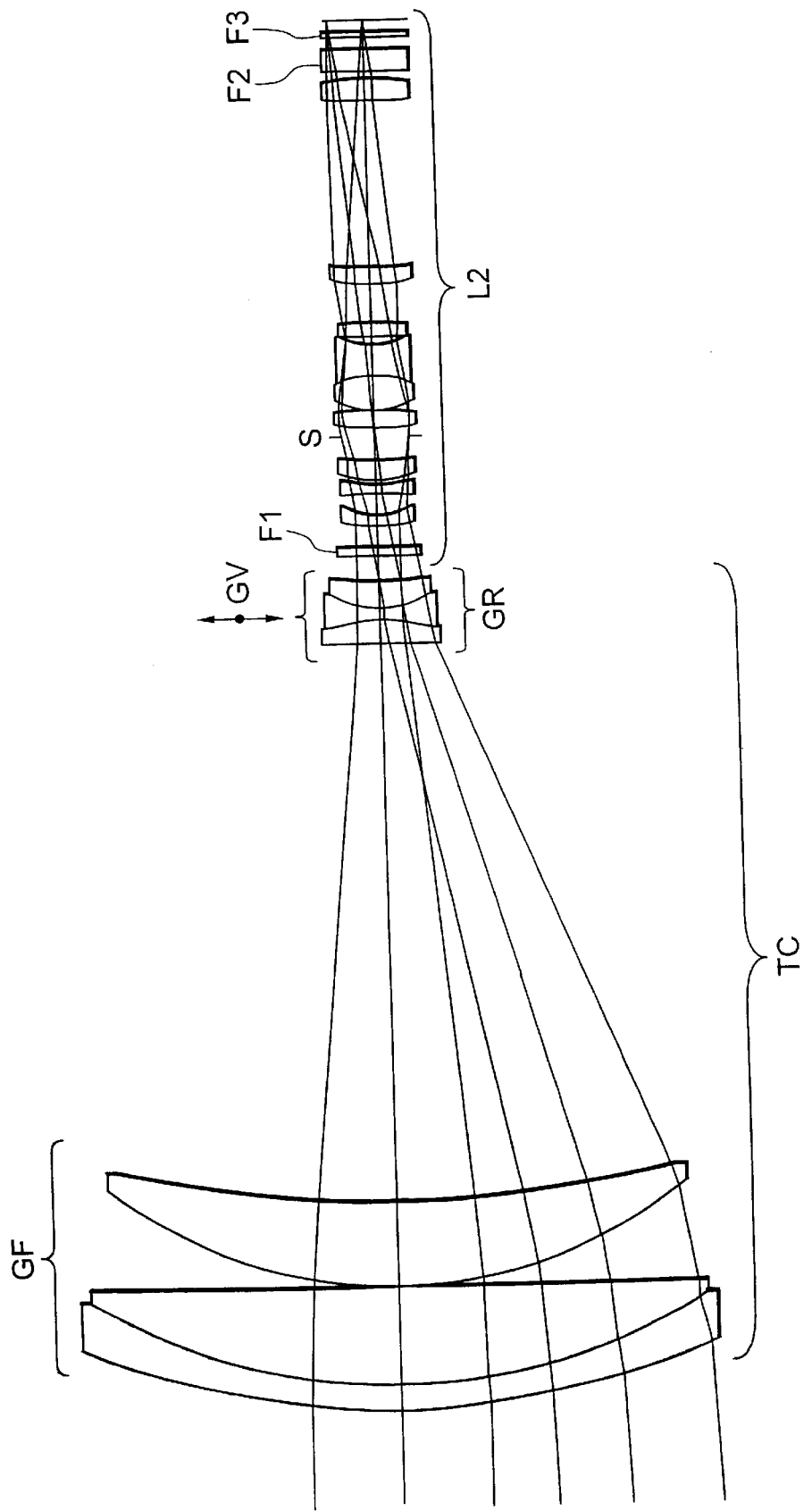
FIG. 7 illustrates the lens construction of a synthesized optical system consisting of a front tele-converter TC and a photo-taking lens L2, according to Fourth Embodiment.
Figures 10A, 10B, 10C, 10D, 10E:
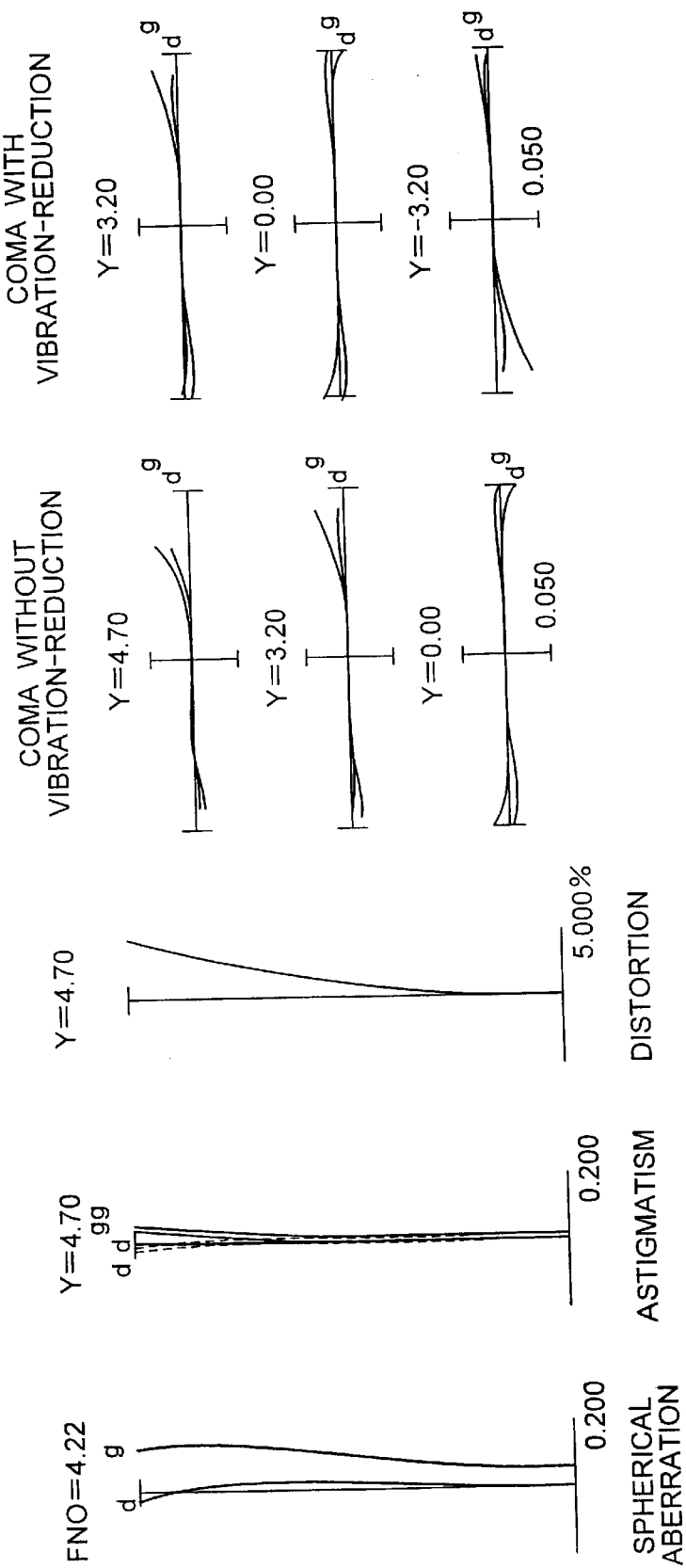
FIGS. 10A to 10E are diagrams showing various aberrations of the synthesized optical system in Fifth Embodiment when the photo-taking lens L2 is in a telephoto end state.

FIG. 7 illustrates the lens construction of a synthesized optical system consisting of a front tele-converter TC and a photo-taking lens L2, according to Fourth Embodiment of the present invention.

In the front tele-converter TC of Fourth Embodiment, the positive lens group GF is constituted of, in order from the object side, i) a positive cemented lens consisting of combination of a negative meniscus lens with its convex surface facing the object side and a positive meniscus lens with its convex surface facing the object side and ii) a positive meniscus lens with its convex surface facing the object side. Also, the negative lens group GR is constituted of a negative cemented lens consisting of combination of a positive meniscus lens with its concave surface facing the object side (with its convex surface facing the image side), a biconcave lens and a positive meniscus lens with its convex surface facing the object side. The photo-taking lens L2 has the same construction as in Third Embodiment except for aspherical surface data.

At the time of vibration reduction, as in Third Embodiment a vibration-reduction lens group GV consisting of the whole of the negative lens group GR is moved in the direction falling at right angles with the optical axis to correct variations of image position which are caused by, e.g., a shake of hand, vibration and so on.

Factorial values of Fourth Embodiment of the present invention are listed in Table 4 below.

TABLE 4

(Whole factors)
F = 90.880
f = 23.380
(Lens factors)

| Surface number | r | d | N (d) | N (g) |
|---|---|---|---|---|
| 1 (GF) | 100.95778 | 3.00000 | 1.805180 | 1.847290 |
| 2 | 70.71094 | 12.00000 | 1.497000 | 1.504510 |
| 3 | 1593.64510 | 0.30000 | | |
| 4 | 56.75897 | 10.00000 | 1.497000 | 1.504510 |

TABLE 4-continued (Whole factors)
F = 90.880
f = 23.380
(Lens factors)

| Surface number | r | d | N (d) | N (g) |
|---|---|---|---|---|
| 5 | 139.20762 | 69.69804 | | |
| 6 (GR) | −123.13799 | 2.50000 | 1.688930 | 1.717970 |
| 7 | −34.91135 | 1.50000 | 1.834810 | 1.859530 |
| 8 | 13.40252 | 3.20000 | 1.721510 | 1.753990 |
| 9 | 46.80575 | 3.45156 | | |
| 10 (F1) | ∞ | 1.00000 | 1.516800 | 1.526703 |
| 11 | ∞ | 2.78682 | | |
| 12 | 24.48279 | 1.30000 | 1.804000 | 1.825700 |
| 13 | 9.03807 | 2.75000 | | |
| 14 | −64.22243 | 1.10000 | 1.620410 | 1.633150 |
| 15 | 16.64281 | 0.60000 | | |
| 16 | 13.25307 | 2.50000 | 1.846660 | 1.894190 |
| 17 | 31.08525 | 3.01286 | | |
| 18 (S) | ∞ | 1.00000 | | |
| 19 | 25.87268 | 2.20000 | 1.804000 | 1.825700 |
| 20 | −53.10268 | 0.20000 | | |
| 21 | 10.85583 | 3.90000 | 1.639300 | 1.657400 |
| 22 | −16.32580 | 4.00000 | 1.784700 | 1.824280 |
| 23 | 8.29724 | 0.90000 | | |
| 24 | 104.53267 | 1.95000 | 1.487490 | 1.495960 |
| 25 | −30.45893 | 4.45000 | | |
| 26 | 16.98763 | 2.25000 | 1.804400 | 1.830340 |
| 27 | 41.36980 | 20.53954 | | |
| 28 | 132.15180 | 2.50000 | 1.606020 | 1.619100 |
| 29* | 36.47286 | 1.00000 | | |
| 30 (F2) | ∞ | 2.59000 | 1.516800 | 1.526703 |
| 31 | ∞ | 1.50000 | | |
| 32 (F3) | ∞ | 0.75000 | 1.516800 | 1.526703 |
| 33 | ∞ | 1.41108 | | |

Aspherical Surface Data 29 surface r=−36.47286 k=1.0000

$C_4=1.61060\times10^{-4}$ $C_6=1.16710\times10^{-6}$ $C_8=-3.79980\times10^{-8}$ $C_{10}=4.24800\times10^{-10}$ Vibration-Reduction Data

ΔS+0.2

ΔY−0.1602

Condition-Corresponding Values

ΔS+0.2

ΔY−0.1602 fV=−28.908 fF=116.064 fR=28.908

ΦF=86

ΦR=13.23

DFR=69.698

ΦV=10.53

M=3.909

ΔS/|fV|=0.00692        (1)

|fV|/fF|=0.249        (2)

ΔS/ΦF=0.00233        (3)

ΦF/ΦR=6.50        (4)

ΦR/fF=0.114        (5)

(ΔS)²/DFR.ΦV=0.000055        (6)

N=1.83481        (7)

v=31.07        (8)

fF.M/DFR=6.509        (9)

(RB−RA)/(RB+RA)=−0.558        (10)

FIGS. 8A to 8E are diagrams showing various aberrations of the synthesized optical system in Fourth Embodiment.

As can be seen from the aberration diagrams, in Fourth Embodiment, various aberrations inclusive of those at the time of vibration reduction are well corrected and a superior imaging quality and a superior vibration-reduction quality are ensured, though the tele-converter has a high magnification (M=3.909).

Fifth Embodiment

FIGS. 9A and 9B illustrate the lens construction of a synthesized optical system consisting of a front tele-converter TC and a photo-taking lens L2, according to Fifth Embodiment of the present invention. In Fifth Embodiment, the photo-taking lens L2 is set up as a zoom lens. Accordingly, FIGS. 9A and 9B show the lens position at a telephoto end (T) and the lens position at a wide-angle end (W), respectively.

In the front tele-converter TC of Fifth Embodiment, the positive lens group GF is constituted of, in order from the object side, i) a positive cemented lens consisting of combination of a negative meniscus lens with its convex surface facing the object side and a biconvex lens and ii) a positive meniscus lens with its convex surface facing the object side. Also, the negative lens group GR is constituted of i) a negative cemented lens consisting of combination of a biconvex lens and a biconcave lens and ii) a biconvex lens.

The photo-taking lens L2 is constituted of, in order from the object side, a first lens group G1, a second lens group G2 and a third lens group G3. The first lens group G1 is constituted of, in order from the object side, a negative meniscus lens with its convex surface facing the object side, a biconcave lens and a positive meniscus lens with its convex surface facing the object side. The second lens group G2 is constituted of, in order from the object side, a biconvex lens, a cemented lens of a biconvex lens and a biconcave lens, a positive meniscus lens with its convex surface facing the object side and a positive meniscus lens with its convex surface facing the object side. The third lens group G3 is constituted of a biconvex lens.

Thus, in the photo-taking lens L2 of Fifth Embodiment, which is set up as a zoom lens, its lens construction in a telephoto end state is the same as that of Fourth Embodiment, and is also the same as that of Third Embodiment except for aspherical surface data.

Incidentally, in the optical path extending between the biconvex lens of the photo-taking lens L2 on its side closest to the image side and an imaging plane, two plane-parallel plates F2 and F3 are disposed as filters. Also, at the time of zooming from the telephoto end (T) to the wide-angle end (W), the first lens group G1 and the second lens group G2 are both moved to the image side and the third lens group G3 stands stationary. Between the first lens group G1 and the second lens group G2, an aperture stop S is disposed, and this aperture stop S is moved together with the second lens group G2 at the time of zooming.

At the time of vibration reduction, a vibration-reduction lens group GV consisting of a negative cemented lens that constitutes part of the negative lens group GR is moved in the direction falling at right angles with the optical axis to correct variations of image position which are caused by, e.g., a shake of hands, vibration and so on.

Factorial values of Fifth Embodiment of the present invention are listed in Table 5 below.

TABLE 5

(Whole factors)
F = 45.406 (telephoto end)~26.266 (wide-angle end)
f = 23.380 (telephoto end)~13.568 (wide-angle end)
(Lens factors)

| Surface number | r | d | N (d) | N (g) |
|---|---|---|---|---|
| 1 (GF) | 72.79699 | 2.60000 | 1.805180 | 1.847290 |
| 2 | 42.11701 | 13.50000 | 1.516330 | 1.526210 |
| 3 | −114.65443 | 0.20000 | | |
| 4 | 25.67161 | 8.00000 | 1.516330 | 1.526210 |
| 5 | 33.28349 | 14.50000 | | |
| 6 (GR) | 444.21147 | 4.00000 | 1.728250 | 1.762000 |
| 7 | −29.88084 | 1.50000 | 1.743200 | 1.762050 |
| 8 | 33.15908 | 3.50000 | | |
| 9 | −80.00000 | 2.00000 | 1.563840 | 1.575310 |
| 10 | 460.66932 | (d10 = variable) | | |
| 11 | 24.48279 | 1.30000 | 1.804000 | 1.825700 |
| 12 | 9.03807 | 2.75000 | | |
| 13 | −64.22243 | 1.10000 | 1.620410 | 1.633150 |
| 14 | 16.64281 | 0.60000 | | |
| 15 | 13.25307 | 2.50000 | 1.846660 | 1.894190 |
| 16 | 31.08525 | (d16 = variable) | | |
| 17 (S) | ∞ | 1.00000 | | |
| 18 | 25.87268 | 2.20000 | 1.804000 | 1.825700 |
| 19 | −53.10268 | 0.20000 | | |
| 20 | 10.85583 | 3.90000 | 1.639300 | 1.657400 |
| 21 | −16.32580 | 4.00000 | 1.784700 | 1.824280 |
| 22 | 8.29724 | 0.90000 | | |
| 23 | 104.53267 | 1.95000 | 1.487490 | 1.495960 |
| 24 | −30.45893 | 4.45000 | | |
| 25 | 16.98763 | 2.25000 | 1.804400 | 1.830340 |
| 26 | 41.36980 | (d26 = variable) | | |
| 27 | 132.15180 | 2.50000 | 1.606020 | 1.619100 |
| 28* | −36.47286 | 1.00000 | | |
| 29 (F2) | ∞ | 2.59000 | 1.516800 | 1.526703 |
| 30 | ∞ | 1.50000 | | |
| 31 (F3) | ∞ | 0.75000 | 1.516800 | 1.526703 |
| 32 | ∞ | 1.23990 | | |

Aspherical Surface Data 28 surface $r = -36.47286 \, \kappa = 1.0000$ $C_4 = 1.61060 \times 10^{-4} \quad C_6 = 1.16710 \times 10^{-6}$ $C_8 = -3.79980 \times 10^{-8} \quad C_{10} = 4.24800 \times 10^{-10}$

| | Telephoto end (T) | Wide-angle end (W) |
|---|---|---|
| (Variable gap in zooming) | | |
| f | 23.380 | 13.568 |
| d 10 | 3.03500. | 8.14178 |
| d 16 | 3.01286 | 9.71541 |
| d 26 | 20.53954 | 8.73021 |

| | Telephoto end (T) | Wide-angle end (W) |
|---|---|---|
| (Vibration reduction data) | | |
| Δ S | =0.2 | =0.2 |
| Δ Y | −0.1013 | −0.5857 |

Condition-Corresponding Values

ΔS+0.2

ΔY−0.1013(telephoto end)

fV=−47.248 fF=65.929 fR=−33.272

ΦF=54.42

ΦR=14.06

DFR=14.5

ΦV=16.28

M=1.946(telephoto end)

$\Delta S/|fV|=0.00423$      (1)

$|fV|/fF=0.717$      (2)

$\Delta S/\Phi F=0.00368$      (3)

$\Phi F/\Phi R=3.87$      (4)

$\Phi R/fF=0.213$      (5)

$(\Delta S)^2/DFR \cdot \Phi V=0.000169$      (6)

$N=1.74320$      (7)

$v=28.46$      (8)

$fF \cdot M/DFR=8.848$      (9)

$(RB-RA)/(RB+RA)=-1.144$      (10)

FIGS. 10A to 10E are diagrams showing various aberrations of the synthesized optical system in Fifth Embodiment when the photo-taking lens L2 is in the telephoto end state. Also, FIGS. 11A to 11E are diagrams showing various aberrations of the synthesized optical system in Fifth Embodiment when the photo-taking lens L2 is in the wide-angle end state.

As can be seen from the aberration diagrams, in Fifth Embodiment, various aberrations inclusive of those at the time of vibration reduction are well corrected and a superior imaging quality and a superior vibration-reduction quality are ensured at respective focal lengths in the state of from telephoto end to wide-angle end, though the tele-converter has a high magnification (M=1.946).

FIGS. 12A to 12D are diagrams showing various aberrations of a single optical system of the photo-taking lens L1 used in Third Embodiment but not making use of the front tele-converter having vibration-reduction function of the present invention; which are shown for reference. FIGS. 13A to 13D are diagrams showing various aberrations of the single optical systems used in Fourth Embodiment and Fifth Embodiment but not making use of the front tele-converter having vibration-reduction function of the present invention, when the photo-taking lenses L2 are in a telephoto end state; which are shown for reference. FIGS. 14A to 14D are diagrams showing various aberrations of the single optical systems used in Fourth Embodiment and Fifth Embodiment but not making use of the front tele-converter having vibration-reduction function of the present invention, when the photo-taking lenses L2 are in a wide-angle end state; which are shown for reference.

The aberrations in the front tele-converter of the present invention are values obtained by subtracting the values of corresponding various aberrations of a photo-taking lens alone from the values of various aberrations of the synthesized optical system consisting of a front tele-converter and a photo-taking lens. Hence, the various aberrations of the front tele-converter of the present invention are understood to have well been corrected.

Stated additionally, in the above respective Embodiments, "mm" is commonly used as the units of focal length, radius of curvature, air gap of lens surface and other length, unless particularly noted. Since, however, optical systems can provide equal optical qualities even in proportional magnification or proportional reduction, the units are by no means limited to "mm", and any other suitable units may be used.

Also, as for the photo-taking lens, it is applicable to lenses of still cameras, digital still cameras, video cameras and so forth.

Vibration sensors, control systems, power feed sources and so forth may also each be incorporated in the front tele-converter of the present invention, or may be provided on the side of photo-taking lens main bodies via electrical contacts (terminals).

As having been described above, according to the first invention, a front tele-converter can be materialized which is a front tele-converter mounted to, e.g., a digital still camera on its object side to have the function of telephotography and which may cause less aberrations and has a superior imaging quality though it has a high magnification.

According to the second invention, a front tele-converter can also be materialized which is a front tele-converter mounted to a photo-taking lens on its object side to have the function of telephotography and which can well correct various aberrations also at the time of vibration reduction and has a superior imaging quality and a superior vibration-reduction quality, though it has a high magnification.

What is claimed is:

1. A front tele-converter having vibration-reduction function, having an afocal magnification higher than 1.9, and which is detachably mountable to a photo-taking lens on its object side, wherein:
   said front tele-converter has, in order from the object side, a positive lens group (GF) having a positive refractive power and a negative lens group (GR) having a negative refractive power;
   the positive lens group (GF) has a positive cemented lens;
   the negative lens group (GR) has a cemented lens comprising a positive lens with its convex surface facing the image side;
   a vibration-reduction lens group (GV) comprising a lens group consisting of part or the whole of the negative lens group (GR) and having a negative refractive power is movable in a direction disposed at substantially right angles with the optical axis to effect vibration reduction; and
   the lens groups fulfill the conditions of:

$\Delta S/|fV| < 0.2$; and $0.1 < |fV|/fF < 5.0$ where the maximum amount of movement of the vibration-reduction lens group (GV) at the time of vibration reduction, in the direction disposed at substantially right angles with the optical axis is represented by $\Delta S$, a focal length of the vibration-reduction lens group (GV) by fV, and a focal length of the positive lens group (GF) by fF.

2. The front tele-converter according to claim 1, wherein:
   the lens groups fulfill the conditions of:

$\Delta S/\Phi F < 0.2$; and $2.0 < \Phi F/\Phi R < 10.0$ where the maximum amount of movement of the vibration-reduction lens group (GV) in the direction disposed at substantially right angles with the optical axis is represented by $\Delta S$, an effective aperture of a lens surface of the positive lens group (GF) on its side closest to the object side by $\Phi F$, and an effective aperture of a lens surface of the negative lens group (GR) on its side closest to the object side by $\Phi R$.

3. The front tele-converter according to claim 2, wherein said positive lens group (GF) has a positive cemented lens disposed closest to the object side and consisting of a combination of a negative meniscus lens and a positive lens;
   said negative lens group (GR) has a positive lens disposed closest to the object side and a biconcave lens disposed on the image side of the positive lens; and
   the lens groups fulfill the condition of:

$0.03 < \Phi R/fF < 1.0$ where a focal length of said positive lens group (GF) is represented by fF, and an effective aperture of a lens surface of said negative lens group (GR) on its side closest to the object side by $\Phi R$.

4. The front tele-converter according to claim 3, wherein:
   said vibration-reduction lens group (GV) comprises, in order from the object side, a cemented lens consisting of a combination of a positive lens with its convex surface facing the image side and a biconcave lens; and
   the lens groups fulfill the condition of:

$0.000001 < (\Delta S)^2/DFR \cdot \Phi V < 0.01$ where an effective aperture of a lens surface of said vibration-reduction lens group (GV) on its side closest to the object side is represented by $\Phi V$, and an air gap between said positive lens group (GF) and said negative lens group (GR) along the optical axis by DFR.

5. The front tele-converter according to claim 2, wherein:
   said vibration-reduction lens group (GV) comprises, in order from the object side, a cemented lens consisting of a combination of a positive lens with its convex surface facing the image side and a biconcave lens; and
   the lens groups fulfill the condition of:

$0.000001 < (\Delta S)^2/DFR \cdot \Phi V < 0.01$ where an effective aperture of a lens surface of said vibration-reduction lens group (GV) on its side closest to the object side is represented by $\Phi V$, and an air gap between said positive lens group (GF) and the negative lens group (GR) along the optical axis by DFR.

6. The front tele-converter according to claim 1, wherein:
   said positive lens group (GF) has a positive cemented lens consisting of a combination of a negative meniscus lens disposed closest to the object side and a positive lens;
   said negative lens group (GR) has a positive lens disposed closest to the object side and a biconcave lens disposed on the image side of the positive lens; and the lens groups fulfill the condition of:

$$0.03 < \Phi R/fF < 1.0$$

where a focal length of said positive lens group (GF) is represented by fF, and an effective aperture of a lens surface of said negative lens group (GR) on its side closest to the object side by ΦR.

7. The front tele-converter according to claim 6, wherein:
said vibration-reduction lens group (GV) comprises, in order from the object side, a cemented lens consisting of combination of a positive lens with its convex surface facing the image side and a biconcave lens; and
the lens groups fulfill the condition of:

$$0.000001 < (\Delta S)^2/DFR \cdot \Phi V < 0.01$$

where an effective aperture of a lens surface of said vibration-reduction lens group (GV) on its side closest to the object side is represented by ΦV, and an air gap between said positive lens group (GF) and the negative lens group (GR) along the optical axis by DFR.

8. The front tele-converter according to claim 1, wherein:
said vibration-reduction lens group (GV) comprises, in order from the object side, a cemented lens consisting of a combination of a positive lens with its convex surface facing the image side and a biconcave lens; and
the lens groups fulfill the condition of:

$$0.000001 < (\Delta S)^2/DFR \cdot \Phi V < 0.01$$

where an effective aperture of a lens surface of said vibration-reduction lens group (GV) on its side closest to the object side is represented by ΦV, and an air gap between said positive lens group (GF) and the negative lens group (GR) along the optical axis by DFR.

* * * * *